(12) United States Patent
Kitte et al.

(10) Patent No.: US 7,527,121 B2
(45) Date of Patent: May 5, 2009

(54) PEDESTRIAN PROTECTION AIR BAG SYSTEM

(75) Inventors: Hajime Kitte, Aichi-ken (JP); Shigeyuki Suzuki, Aichi-ken (JP); Shinji Oguchi, Aichi-ken (JP); Toshikatsu Togawa, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/004,515

(22) Filed: Dec. 21, 2007

(65) Prior Publication Data

US 2008/0308338 A1 Dec. 18, 2008

(30) Foreign Application Priority Data

Dec. 28, 2006 (JP) ............................. 2006-355547
Jan. 30, 2007 (JP) ............................. 2007-020004

(51) Int. Cl.
*B60K 28/10* (2006.01)
*B60T 7/12* (2006.01)

(52) U.S. Cl. ................. 180/274; 296/193.11; 180/69.2; 180/69.21; 280/728.2; 280/743.1

(58) Field of Classification Search .............. 280/743.1; 180/271, 274, 69.2, 69.21; 296/193.11
See application file for complete search history.

(56) References Cited

U.S. PATENT DOCUMENTS

| | | | |
|---|---|---|---|
| 6,182,782 B1 * | 2/2001 | Matsuura et al. | 180/274 |
| 6,513,617 B2 * | 2/2003 | Sasaki et al. | 180/274 |
| 6,554,093 B2 * | 4/2003 | Sasaki et al. | 180/274 |
| 6,668,962 B2 * | 12/2003 | Son | 180/274 |
| 6,920,954 B2 * | 7/2005 | Hashimoto et al. | 180/274 |
| 6,923,286 B2 * | 8/2005 | Sato et al. | 180/274 |
| 7,150,495 B2 * | 12/2006 | Fayt et al. | 296/187.02 |
| 7,174,985 B2 * | 2/2007 | Sawa et al. | 180/274 |
| 7,303,040 B2 * | 12/2007 | Green et al. | 180/274 |
| 7,334,656 B2 * | 2/2008 | Kramarczyk et al. | 180/274 |
| 7,341,274 B2 * | 3/2008 | Mori et al. | 280/728.2 |
| 7,410,027 B2 * | 8/2008 | Howard | 180/274 |

(Continued)

FOREIGN PATENT DOCUMENTS

JP    A-2002-36986    2/2002

(Continued)

*Primary Examiner*—Toan C To
(74) *Attorney, Agent, or Firm*—Posz Law Group, PLC

(57) ABSTRACT

There is provided a pedestrian protection air bag system M1 in which air bags accommodated on a cowl each have a recessed portion which avoids a hinge mechanism and project from lateral side edges of a lower surface of a hood panel at a rear end thereof so as to cover front sides of front pillars. The hood panel is configured to be raised on a rear end side thereof so as to form a projection space for the air bags between the cowl and the rear end of the hood panel, while when in normal use, the hood panel is made to be opened upwards at a front end side thereof by means of the hinge mechanisms provided near the left and right edges at the rear end thereof. The hinge mechanisms, cases which cover the folded air bags and actuators for raising the hood panel are provided sequentially in that order towards the front on the lateral side edge of the hood panel at the rear end thereof.

5 Claims, 25 Drawing Sheets

U.S. PATENT DOCUMENTS

| | | |
|---|---|---|
| 2002/0014761 A1 | 2/2002 | Miyasaka et al. |
| 2005/0206139 A1* | 9/2005 | Mori et al. ............... 280/730.1 |

FOREIGN PATENT DOCUMENTS

| | | |
|---|---|---|
| JP | A-2003-89333 | 3/2003 |
| JP | A-2003-191818 | 7/2003 |
| JP | A-2006-44289 | 2/2006 |
| JP | A-2006-96224 | 4/2006 |

* cited by examiner

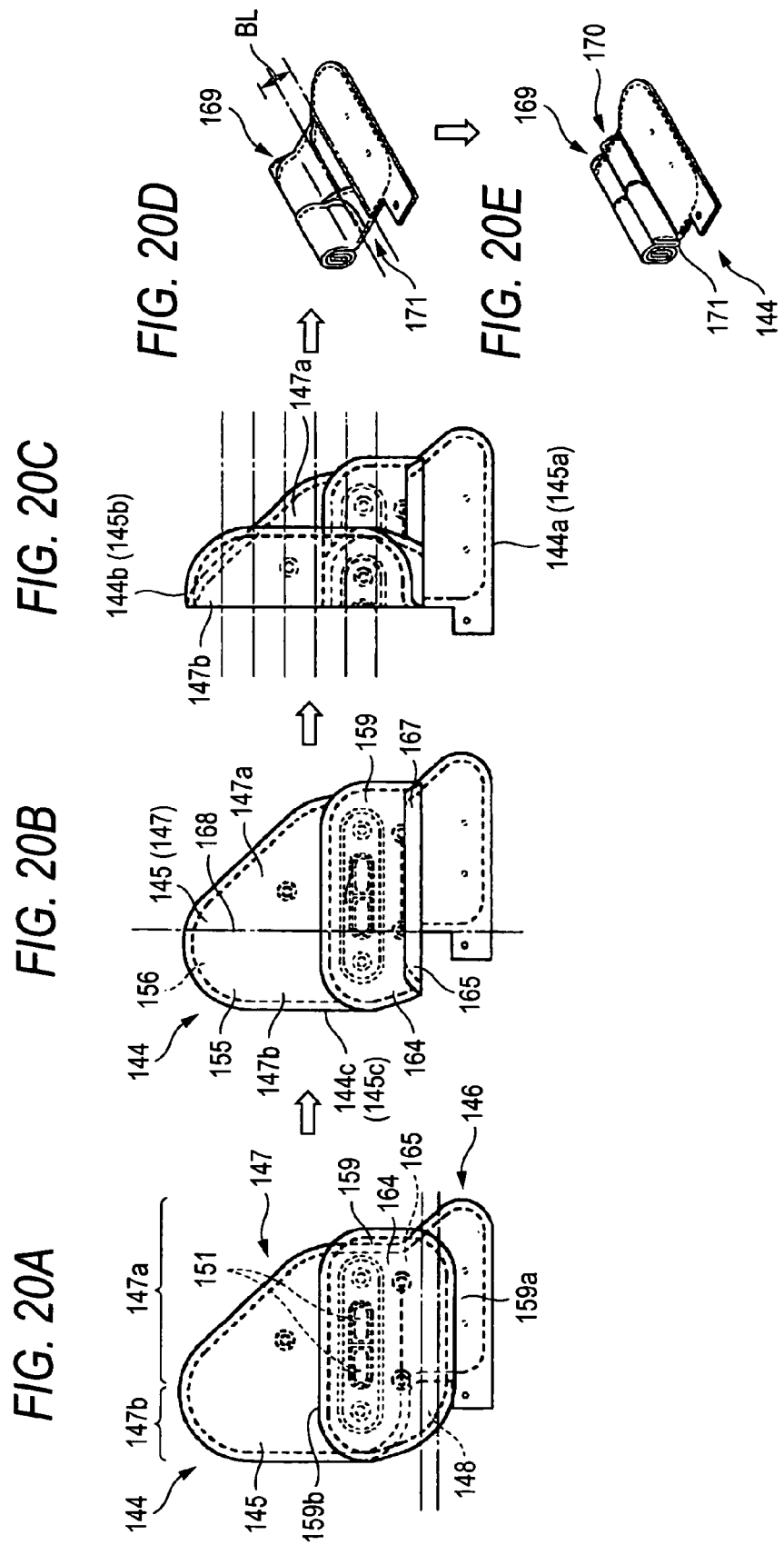

PEDESTRIAN PROTECTION AIR BAG SYSTEM

BACKGROUND OF THE INVENTION

1. Field of the Invention

The present invention relates to a pedestrian protection air bag system in which air bags which are adapted to cover front sides of left and right front pillars of a vehicle when they complete inflation are folded and accommodated, respectively, on left and right sides of a cowl below a hood panel of the vehicle near a rear end thereof.

2. Related Art

Some of conventional pedestrian protection air bag systems are configured such that air bags, which are folded, are accommodated, respectively, near left and right-hand sides of a cowl of a vehicle, so that when they have completed inflation, the air bags cover front sides of left and right front pillars of the vehicle (Refer to JP-A-2002-36986).

In those pedestrian protection air bag systems, a hood panel of the vehicle is configured such that a rear end side is raised to form a projection space between the cowl and a rear end of the hood panel for the air bags to project therethrough when they deploy and inflate while when in normal use a front end side is raised to open upwards by hinge mechanisms provided near left and right edges at the rear of the hood panel. The hinge mechanisms are each configured such that a bracket mounted at the rear of the hood panel is pivotally supported on a stay portion which extends upwards from a body side of the vehicle.

Then, in the pedestrian protection air bag systems, mechanisms for raising the rear end of the hood panel raise the stay portions themselves by means of actuators such as using solenoids to form the projection space between the cowl and the rear end of the hood panel for the air bags to project therethrough when the air bags deploy and inflate.

In addition, there is a pedestrian protection air bag system mounted which is not mounted on a cowl but on a hood panel and in which air bags are provided so as to cover front sides of front pillars, as well as upper surfaces of portions of the hood panel lying at a rear thereof (for example, JP-A-2006-44289). In this pedestrian protection air bag system, a panel side inflation portion of the air bag which is adapted to cover the upper surface side of the hood panel is internally roll folded in such a manner that a front end side is oriented downwards so that the panel side inflation portion is prevented from floating apart from the upper surface side of the hood panel when the air bag deploys and inflates, and following this, the panel side inflation portion so folded is then folded integrally with a pillar side inflation portion which is adapted to cover front sides of a windshield and a front pillar, whereby the air bag is so folded for accommodation in an accommodating location lying on a lower surface of the hood panel at a rear end thereof.

In the pedestrian protection air bag system which is configured such that the hinge mechanisms which are disposed at the end of the hood panel themselves are raised to raise the rear end of the hood panel so as to form the projection space for the air bags, however, moving portions of the actuators need to travel a distance equal to an open distance of the projection space formed at the rear of the hood panel, and the actuators need, in turn, to be enlarged, which is undesirable in consideration of the application of the relevant air bag system to a vehicle where space is limited.

In addition, in order for the air bags to cover the front sides of the front pillars in a stable fashion when they complete inflation, the air bags are desirably disposed, respectively, near locations lying directly below the front pillars (at the front thereof). However, the hinge mechanisms of the hood panel are provided in the locations lying directly below the front pillars, and hence, it is difficult to dispose cases which accommodate therein the folded airbags in the locations lying directly below the front pillars. Furthermore, the air bags tend to easily interfere with (contact) the hinge mechanisms partway to deployment and inflation, and when considering their purpose of covering the front sides of the front pillars in the stable fashion, there have still been room for improvement.

In addition, in the conventional pedestrian protection air bag systems, while irregular portions are formed on a lower side of the hood panel for guiding the air bags when they deploy, the air bags come to interfere with these irregular portions when they deploy and inflate, whereby a quick deployment of the air bags is interrupted.

Furthermore, in the conventional pedestrian protection air bag systems, the air bags are made to positively interfere with the hinge mechanisms so as to use the locations of the hinge mechanisms to prevent the lateral deviation thereof, and portions of the air bags where their positions are restricted come to lie on lower sides of the front pillars and to constitute part of proximal portions which are spaced away from projection ends of the air bags. In this configuration, when contact conditions of the air bags with the hinge mechanisms differ from as designed, resulting positions of the projection ends of the air bags tend to easily deviate largely from the designed positions, and therefore, on the contrary to the designed manner, there is caused a fear that a smooth deployment of the air bags cannot be secured in a stable fashion.

Further, in the pedestrian protection air bag system which is mounted on the cowl, when the air bags are made to cover the upper surface of the hood panel, since the hood panel is raised to form the projection space for the air bags, there will easily be caused a fear that the portions of the air bags which are originally designed to cover the upper surface side of the hood panel deploy and inflate on the lower surface side of the hood panel.

In addition, in the pedestrian protection air bag system which is mounted on the cowl, when the air bags are made to cover the front pillars, the portions of the air bags which are originally designed to cover the front pillars desirably deploy and inflate smoothly and stably so as to cover the front pillars while suppressing the interference (contact) with the hinge mechanisms of the hood panel. Furthermore, even though the front pillars are covered, there still remain corner portions where the rear end of the hood panel intersects the lateral side edges thereof directly below the front pillars, and hence, the air bags desirably deploy and inflate smoothly and quickly so as to cover the upper surface side of the hood panel including the corner portions.

SUMMARY OF THE INVENTION

The invention has been made with a view to solving the problems and an object thereof is to provide a pedestrian protection air bag system in which air bags can deploy and inflate quickly and can cover the front sides of the front pillars of the vehicle in a stable fashion and which can be fitted on the vehicle while saving the space therein.

Further, another object thereof is to provide a pedestrian protection air bag system in which air bags accommodated on a cowl deploy and inflate stably and smoothly so as to cover front sides of front pillars and the vicinities of rear end corner portions on an upper surface side of a hood panel.

According to an aspect of the invention, there is provided a pedestrian protection air bag system comprising cases and air bags folded and accommodated, respectively, in the cases, which cases and air bags are provided and mounted on a cowl of a vehicle in locations lying below left and right edges of a hood panel near a rear end thereof, respectively, each air bag being configured to cover a front side of a front pillar of the vehicle which lies in the vicinity of the case when the air bag projects rearwards from the case by introducing inflation gas thereinto, the hood panel being provided in such a manner that a rear end side is raised so as to form a projection space between the cowl and the rear end of the hood panel for the air bag to project therethrough when the air bag deploys and inflates while when in normal use, a front end side can be raised to open upwards by hinge mechanisms provided near the left and right edges at the rear thereof, respectively, wherein the hinge mechanisms which are provided on left and right sides of the hood panel near the rear end thereof each include:

a hinge base which is fixed to a body side of the vehicle to lie at the rear and transversely slightly outboards of the left or right side edge of the hood panel as viewed from the top;

a mounting bracket which is fixed to the hood panel to be disposed at the front of the hinge base within the region of the hood panel as viewed from the top; and a hinge arm which is pivotally supported on the hinge base on a rear end side and is pivotally supported on the mounting bracket on a front end side thereof and in which a rear end side pivot portion which is pivotally supported on the hinge base is made to be a normal rotation pivot portion which is made to rotate both when the hood panel is in normal use and when the hood panel is raised to form the projection space and a front end side pivot portion which is pivotally supported on the mounting bracket is made to be a push-up rotation pivot portion which is made to rotate only when the hood panel is raised to form the projection space, wherein actuators which are adapted, when in operation, to raise push-up rods which are brought into abutment with a lower surface of the hood panel with their axes made to follow a vertical direction so as to form the projection space are provided, respectively, at the front of the push-up rotation pivot portions of the left and right hinge arms below a lower side of the hood panel near the left and right edges thereof, wherein the cases in which the air bags are accommodated and held are provided, respectively, at the front of the hinge bases and at the rear of the push-up rods of the actuators within the region of the hood panel as viewed from the top with their lateral outer edges disposed near the left and right edges, respectively, near the rear end of the hood panel, and wherein the air bags each comprise as a shape formed when the air bag completes inflation a proximal portion which is disposed on a side of the air bag which faces the case and a main body portion which extends rearwards from the proximal portion so as to cover the front side of the front pillar and comprise on a side of the main body portion which faces the proximal portion a recessed portion which is made to follow inner edges of the hinge base and the hinge arm which has raised its side where the push-up rotation pivot portion resides.

In the pedestrian protection air bag system according to the invention, when in operation, the actuators raise the push-up rods which are brought into abutment with the lower surface side of the hood panel near the lateral side edges near the rear end thereof so as to form the projection space for the air bags. As this occurs, in the hinge mechanisms, while allowing the normal rotation pivot portion and the push-up rotation pivot portion to rotate relative to the hinge base and the mounting bracket, respectively, the hinge arm raises and moves the front end side where the push-up rotation pivot portion is provided obliquely upwards forwards from the rear end side where the normal rotation pivot portion is provided.

Then, the air bags introduce inflation gas thereinto and project rearwards for deployment and inflation. As this occurs, the air bags deploy and inflate smoothly and quickly without interfering with the hinge mechanisms because the air bags are each provided with the recessed portion on the proximal portion side of the main body portion which is made to follow the inner side edges of the hinge base and the hinge arm which has raised the push-up rotation pivot portion side thereof. Of course, the actuator which raises the hood panel is disposed at the front of the case which accommodates therein the air bag, and hence, there is caused no fear that the air bag which deploys and inflates rearwards from the proximal portion side comes to interfere with the push-up rod of the actuator so disposed.

Furthermore, the cases in which the air bags are accommodated and held are provided, respectively, at the front of the hinge bases and at the rear of the push-up rods of the actuators within the region of the hood panel as viewed from the top with their lateral outer edges disposed near the left and right edges, respectively, near the rear end of the hood panel. Due to this configuration, in the air bag which has completed deployment and inflation, as viewed from the top, a lateral side edge of the proximal portion side of the air bag which is mounted on the cowl together with the case is allowed to be disposed to approach the lateral side edges of the hood panel near the rear end thereof, that is, the lateral side edge of the proximal portion which is provided with the recessed portion which is recessed towards a lateral center of the hood panel is allowed to be disposed to approach the location lying directly below the front pillar (directly below on the front side of the front pillar), so that the main body portion which has a portion (a side edge portion) which is situated upwards (rearwards) of the recessed portion and is formed to project transversely outwards from the front side of the front pillar can cover the front side of the front pillar widely and stably with an area which expands from a portion lying rearwards of the proximal portion (a rearward extending portion) to the side edge portion.

In addition, the actuators which raise the rear end of the hood panel are provided on the lower surface side of the hood panel at the front of the push-up rotation pivot portions of the left and right hinge arms and near the left and right edges of the hood panel, respectively. Due to this configuration, the projection space of a predetermined quantity can be formed only by raising the push-up rods a distance as an operation stroke which is smaller than an open distance between the cowl and a position where the hood panel on which the hinge mechanisms are provided is disposed when the projection space for the air bags is formed between the cowl and the rear end of the hood panel, whereby an external shape including the vertical dimension of the actuator itself can be made compact.

Furthermore, the cases in which the folded air bags are accommodated are also provided, respectively, at the front of the hinge bases and at the rear of the push-up rods of the actuators within the region of the hood panel as viewed from the top with their lateral outer edges disposed near the left and right edges, respectively, near the rear end of the hood panel. Namely, in the pedestrian protection air bag system according to the invention, the hinge bases of the hinge mechanisms, the cases which accommodate therein the air bags and the actuators can be disposed sequentially in that order and closely to each other from near the rear ends of the left and right edges towards the front of the hood panel, whereby the overall constituent components can be fitted over compact areas lying near the left and right edges at the rear end of the hood panel.

Consequently, in the pedestrian protection air bag system according to the invention, the air bags can deploy and inflate quickly and can cover the front sides of the front pillars in a stable fashion, and the pedestrian protection air bag system can be fitted on the vehicle while saving the space therein.

In addition, an inflator for supplying inflation gas to the air bag may be accommodated within the case together with the folded air bag. Alternatively, with a supply pipe line for supplying inflation gas to the air bag provided thereon, the inflator may be fixed to the body side of the vehicle outside the case. Incidentally, in the event that the inflator is configured to include the supply pipe line for supplying inflation gas to the air bag, since the inflator can be disposed in a location which lies spaced away from the hood panel and the cowl, the degree of freedom in arrangement of the inflator can be increased.

According to another aspect of the invention, there is provided a pedestrian protection air bag system including air bags folded and accommodated on a cowl of a vehicle in locations lying below left and right edges of a hood panel near a rear end thereof, respectively, the air bags each including, when the air bag introduces inflation gas thereinto, an upper inflation portion which covers an upper surface of a left or right side edge of the hood panel at a rear end thereof and a lower inflation portion which extends rearwards from the accommodating location through between the cowl below the rear end of the hood panel and the rear end of the hood panel so to cover a front side of a front pillar, the hood panel being provided in such a manner that a rear end side is raised so as to form a projection space between the cowl and the rear end of the hood panel for the air bag to project therethrough when the air bag deploys and inflates while when in normal use, a front end side can be raised to open upwards by hinge mechanisms provided near the left and right edges at the rear thereof, respectively, wherein the lower inflation portion of the air bag includes, as a shape resulting when the air bag completes inflation, a proximal portion which is situated on a front end side and is mounted on the accommodating location and a main body portion which extends rearwards from the proximal portion so as to cover the front side of the front pillar, wherein the main body portion includes a recessed portion which is provided on a proximal portion side thereof in such a manner as to follow an inner edge of the hinge mechanism, a side edge portion which is disposed rearwards of the recessed portion and a rear extending portion which extends rearwards of the proximal portion, the main body portion further including a gas inlet port to the upper inflation portion which is disposed near the rear of the rear end of the hood panel when the air bag completes inflation, wherein the upper inflation portion of the air bag is configured such that when the air bag completes inflation, a front end reaches as far as a position lying further rearwards than the accommodating location while covering an area over the recessed portion to reach as far as near a lateral side edge of the side edge portion, and wherein the air bag deploys flat with the upper inflation portion placed above the lower inflation portion, thereafter, a front end side of the upper inflation portion is subjected to external roll folding in which it is wound upwards to the vicinity of the inlet port, following this, the side edge portion of the main body portion of the lower inflation portion is placed on the rear extending portion together with the upper inflation portion, and the air bag is folded from a rear end side thereof in such a manner that the rear end side approaches a front end side for accommodation in the accommodating location.

In the pedestrian protection air bag system according to the invention, when in operation, the air bag introduces inflation gas thereinto and projects from the accommodating locations, so as to deploy and inflate through the projection space for the air bags while smoothing the folds.

As that occurs, in an attempt to smooth the folds by substantially reversing the folding process, the air bag firstly deploys in such a way that the rear end moves away from the front end of the air bag to result in such a state that the side edge portion of the main body portion of the lower inflation portion is disposed above the rear extending portion and the inlet port of the lower inflation portion is disposed near the rear of the rear end of the hood panel, whereby the inflation gas flows into the upper inflation portion from the lower inflation portion via the inlet port. Then, when the upper inflation portion, where the front end side is subjected to external roll folding in which it is wound upwards as far as near the inlet port, smoothes the folds in such a manner as to unwind the roll, the upper inflation portion comes into contact with the upper surface of the hood panel from the rear end thereof so as to deploy with ease over the upper surface as rolling thereover, whereby the upper inflation portion smoothly deploys over the upper surface side of the hood panel. Furthermore, the front end side of the upper inflation portion is made to extend only short from the inlet port so that the upper inflation portion does not project further forwards than the position of the accommodating location even when the air bag completes deployment and inflation, and the portion which is internally roll folded is prevented from becoming voluminous, whereby a winding core of internal roll folds is made easy to be disposed from the vicinity of the rear of the rear end of the hood panel to the vicinity of the upper portion, thereby making it possible to secure a smooth deployment of the upper inflation portion to the upper surface side of the hood panel.

Furthermore, the lower inflation portion smoothes folds in such a manner that the side edge portion rise from the rear extending portion, whereby the side edge portion prevents the interference with the hinge mechanism by bypassing the hinge mechanism by the recessed portion and can thereby be disposed to approach the front pillar from directly below the front pillar, and the main portion of the lower inflation portion including the side edge portion which is positioned upwards (rearwards) of the recessed portion and is formed to project transversely outboards from the front side of the front pillar can cover the front side of the front pillar widely and stably with the area expanding from the rear extending portion which lies rearwards of the proximal portion to the side edge portion.

In addition, of course, the upper inflation portion which is disposed on the upper surface side of the lower inflation portion not only covers the upper surface of the hood panel at the rear end thereof but also passes over the recessed portion of the lower inflation portion and reaches as far as above the front of the side edge portion to cover those areas, whereby the corner portion at the rear end of the hood panel which lies in front of the front pillar can also be covered smoothly.

Consequently, in the pedestrian protection air bag system according to the invention, the air bags accommodated on the cowl can deploy and inflate stably and smoothly, thereby making it possible to cover the front sides of the front pillars and the vicinities of the rear end corner portions on the upper surface side of the hood panel.

In addition, in the event that the lower inflation portion of the air bag is configured such that a vertical thickness dimension resulting below the rear end of the hood panel when the air bag completes inflation in such a state that the hood panel does not exist is made larger than an isolating dimension between the rear end of the hood panel which has been raised to form the projection space for the air bag and the cowl, the lower inflation portion comes to be held between the rear end of the hood panel and the cowl when the air bag completes inflation in such a state that the air bag system is fitted on the vehicle, whereby the lower inflation portion can cover the front side of the front pillar stably without deviating transversely, and the upper inflation portion which is projecting upwards from the lower inflation portion can also be prevented from deviating transversely, thereby making it possible to protect a pedestrian from the front pillar and the corner portion at the rear end of the hood panel in an accurate fashion.

Additionally, in the event that when folding the air bag in such a manner that the rear end side approaches the front end side of the air bag after the side edge portion of the main body portion of the lower inflation portion is placed on the rear extending portion together with the upper inflation portion, an area corresponding to a length which surpasses a range which expands from the accommodating location to a region where a wiper is provided when the air bag completes inflation is corrugated into folds to form a corrugated portion where folds are superposed in a longitudinal direction and an area residing rearwards of the corrugated portion is folded to form an internally roll folded portion where the rear end of the air bag is wound downwards, whereby the air bag is folded for accommodation in the accommodating location, the following function and advantage can be obtained.

Namely, when the air bag projects rearwards from the accommodating location in an initial stage of deployment and inflation thereof, the corrugated portion which is folded by employing the corrugating technique which enables folds produced thereby to be smoothed more quickly than folds produced by the roll folding technique can push out the internally roll folded portion into which most of the region of the air bag is folded further rearwards than the area where the wiper is provided. In addition, when the folds in the internally roll folded portion are smoothed, the internally roll folded portion attempts to deploy along the windshield. When the folds are smoothed in that way, in the event that the externally roll folded portion on the front end side of the upper inflation portion appears in the vicinity of the rear of the rear end of the hood panel, the front end side of the upper inflation portion smoothly deploy over the upper surface side of the hood panel in such a manner as to depart from the internally roll folded portion, while the internally roll folded portion of the lower inflation portion continues to deploy along the windshield until the air bag completes deployment to the portion lying in the vicinity of the rear end thereof, and following this, the folds in the side edge portion are smoothed, whereby the lower inflation portion can complete deployment and inflation while being prevented from floating from the windshield and the front pillar as much as possible. Namely, the air bag can dispose the main portion of the lower inflation portion on the front side of the front pillar smoothly and quickly by suppressing not only the interference of the lower inflation portion and the upper inflation portion with the wiper but also the floating of the lower inflation portion from the windshield and the front pillar.

BRIEF DESCRIPTION OF THE DRAWINGS

FIGS. 20A to 20E are drawings which explain a folding process of the air bag used in the third embodiment.

DETAILED DESCRIPTION OF THE PREFERRED EMBODIMENTS

First Embodiment

Figure 1:
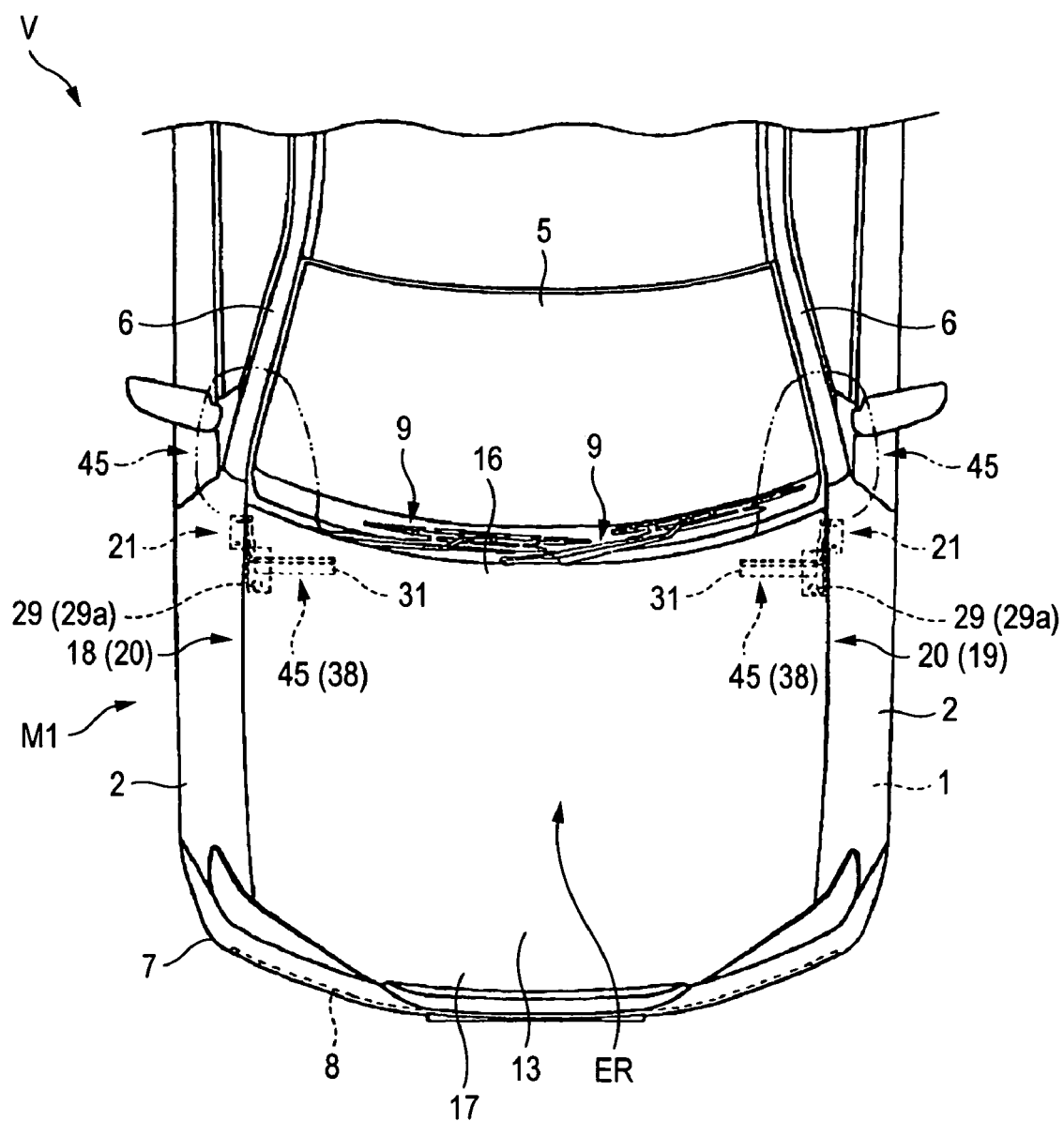
FIG. 1 is a plan view of a vehicle on which a pedestrian protection air bag system which is a first embodiment of the invention is fitted.

Herebelow, embodiments of the invention will be described based on the drawings. As is shown in FIGS. 1 to 3, a pedestrian protection air bag system M1 of a first embodiment of the invention includes, near each of left edge 18 and right edge 19 at a rear end 16 of a hood panel 13 of a vehicle V, an air bag 45, an inflator 38 for supplying inflation gas to the air bag 45, a case 31 which accommodates therein the air bag 45 and the inflator 38, an actuator 29 for raising the rear end 16 of the hood panel 13 and a hinge mechanism 21 which supports the hood panel 13 and guides the rotational movement of the hood panel 13.

Figure 3:
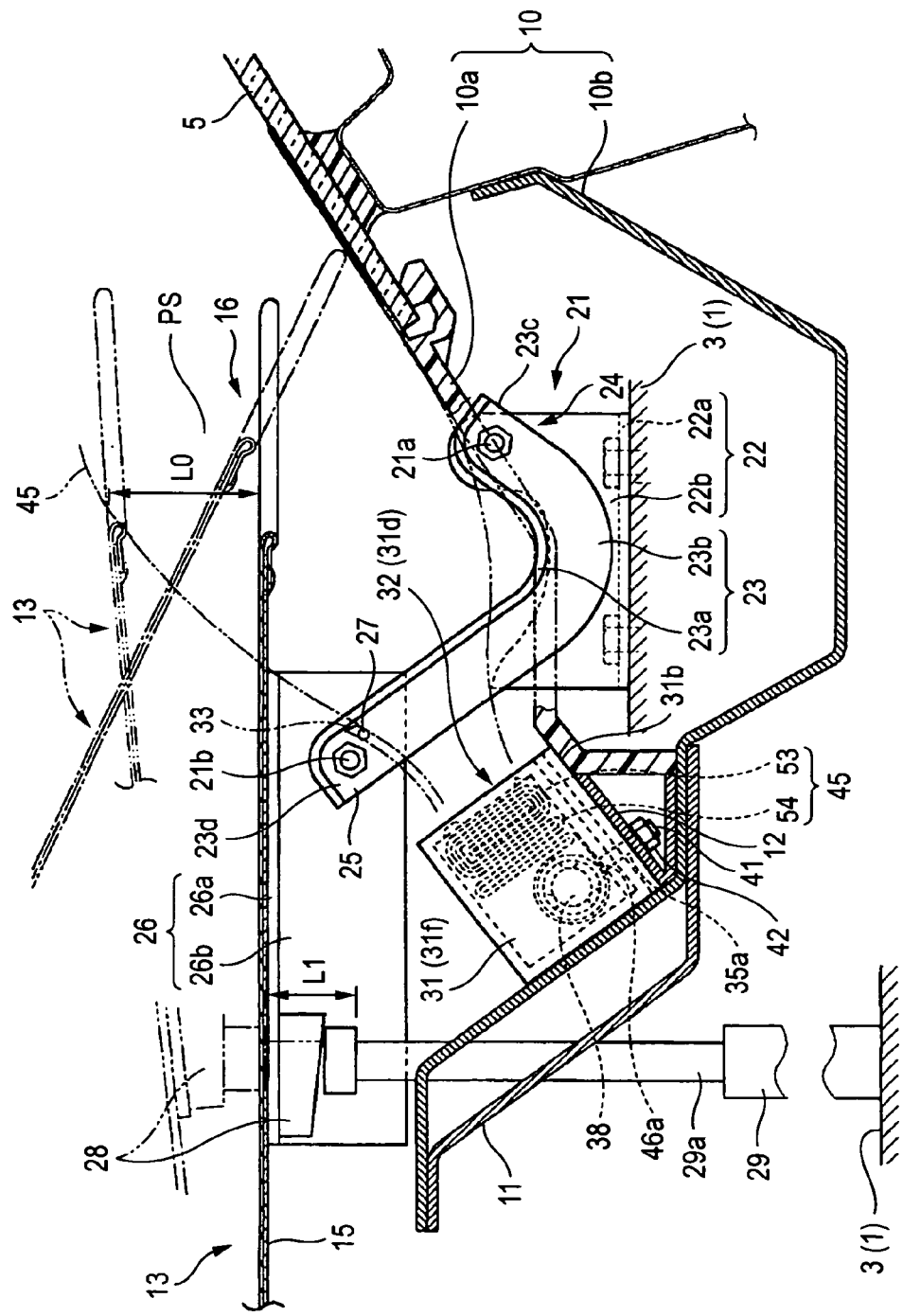
FIG. 3 is a schematic vertical sectional view of the pedestrian protection air bag of the first embodiment taken along a longitudinal direction of the vehicle, which corresponds to a sectional view taken along the line III-III in FIG. 2.

The hood panel 13, which is made of sheet metal and is provided to be placed over an engine compartment ER of the vehicle V to cover the same, is connected to a body 1 of the vehicle V by hinge mechanisms 21 which are disposed near the rear end 16 on both the lateral edge sides (the left edge 18 and the right edge 19) thereof in such a manner that when in normal use, the hood panel 13 can open at the front thereof as indicated by alternate long and short dash lines in FIG. 3 and that when the air bags 45 deploy and inflate, the hood panel 13 can be raised on a rear end 16 side thereof as is indicated by chain double-dashed lines in FIG. 3 so as to form a projection space PS for the air bags 45 to project therethrough between the cowl 10 and the rear end 16 of the hood panel 13. In addition, when the rear end 16 side is raised, a front end 17 side of the hood panel 13 is formed on a body 1 side of the vehicle V in such a manner as to be opened and closed, and the rear end 16 is raised about the front end 17 side as a rotation center.

Figure 2:
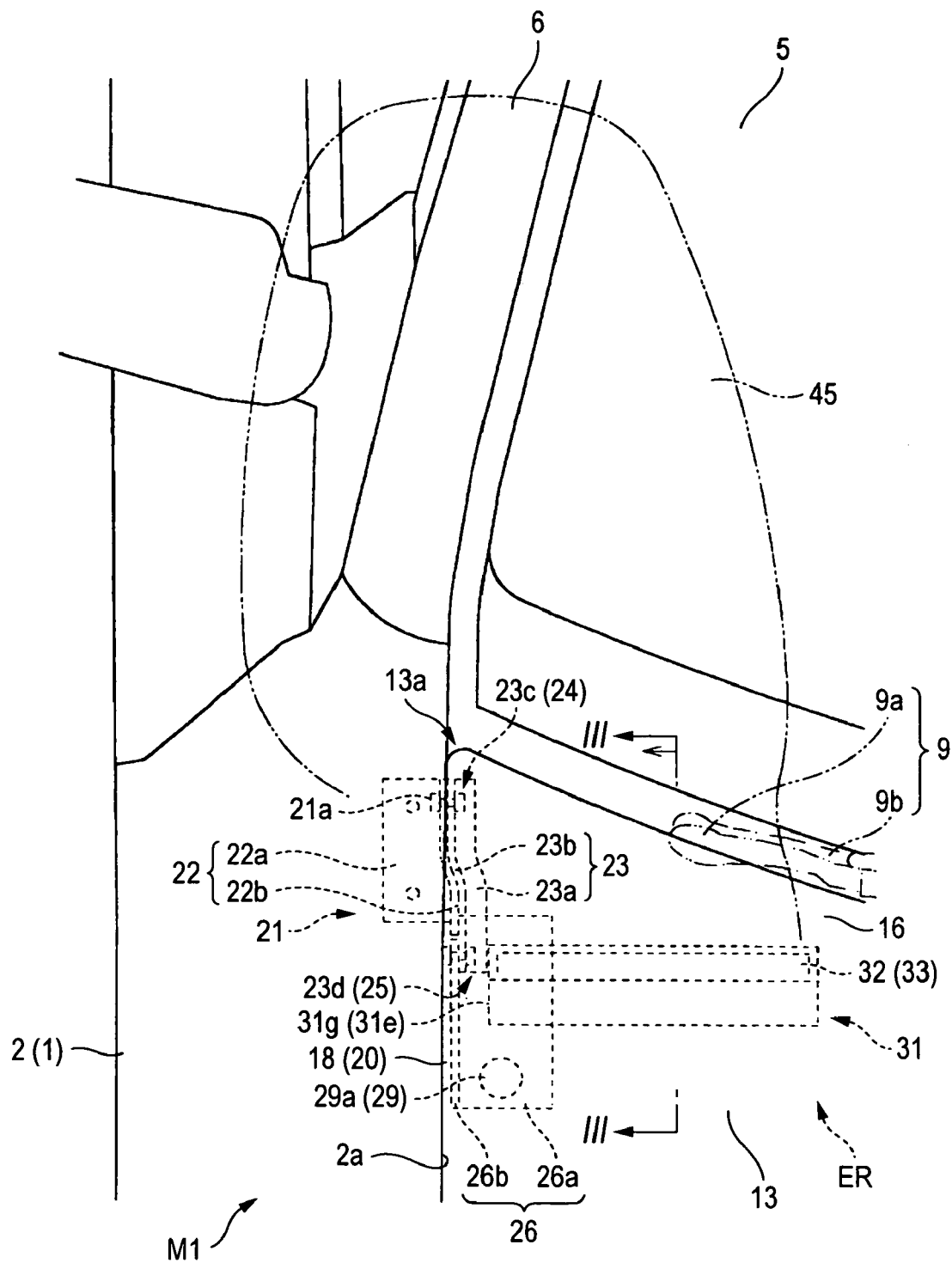
FIG. 2 is an enlarged plan view of the vehicle on which the pedestrian protection air bag system of the first embodiment is fitted.

In addition, as is shown in FIG. 1, a sensor 8 for detecting a collision with a pedestrian is provided on a front bumper 7, and when an activation circuit, not shown, into which signals from the sensor 8 are designed to be inputted detects a collision with a pedestrian based on a signal from the sensor 8, the inflator 38 and the actuator 29 (refer to FIGS. 2, 3) for raising the rear end 16 of the hood panel 13 are designed to be activated.

In this specification, longitudinal (front, rear) and vertical (up, down) directions are based on directions which match the longitudinal and vertical directions of the vehicle, and a lateral (left, right) direction is based on a direction which matches the lateral direction of the vehicle when the viewer is standing to face the front of the vehicle.

In addition, the constituent components such as the air bags 45 of the pedestrian protection air bag system M1 which are disposed on the left and right sides of the hood panel 13 at the rear end 16 thereof are disposed transversely symmetrical, and in the following description, the constituent components of the pedestrian protection air bag system M which are disposed on the left hand side of the vehicle V will be described. However, the respective constituent components which are disposed on the right-hand side and components provided on the body 1 in the vicinity of the fitting position of the right-hand side constituent components are transversely symmetrical with those provided on the left-hand side unless otherwise described, and hence, the description of these right-hand side components will be omitted here. In addition, the left edge 18 and the right edge 19 which constitute the lateral or left and right edges of the hood panel 13 will be described as a side edge 20 unless otherwise described.

As is shown in FIGS. 2 to 4B and 9, the hinge mechanism 21 is configured to include a hinge base 22 which is fixed to the body 1 side or a body 1 side of the vehicle V, a mounting bracket 26 which is fixed to the hood panel 13 or a hood panel 13 side of the vehicle, and a hinge arm 23 which is pivotally supported on the hinge base 22 and the mounting bracket 26 for free rotation thereon.

The hinge base 22 is made of sheet metal and is made up of a horizontal wall portion 22a and a vertical wall portion 22b which are provided in such a manner as to form an L-shaped transverse cross section. The hinge base 22 is fixed to the body 1 side of the vehicle V in a location which lies, as viewed from the top, at the rear end 16 of the hood panel 13 and transversely slightly outboards of the lateral side edge 20. The horizontal wall portion 22a is fixedly mounted on a mounting flange 3 of a body 1 side fender panel 2 which extends towards the engine compartment ER, and the vertical wall portion 22b is provided in such a manner as to extend upwards from an engine compartment ER side of the horizontal wall portion 22a.

The mounting bracket 26 is made of sheet metal and is made up of a horizontal wall portion 26a and a vertical wall portion 26b which are provided in such a manner as to form an inverted L-shaped transverse cross section. The hinge base 26 is fixed to the hood panel 13 side of the vehicle V in a location which lies, as viewed from the top, at the front of the hinge base 22 within the region of the hood panel 13. The horizontal wall portion 26a is fixedly mounted on a lower surface 15 of the hood panel 13 in a location lying at the rear end 16 near the lateral side edge 20 thereof, and the vertical wall portion 26b is provided in such a manner as to extend downwards from an edge of the horizontal wall portion 26a which lies apart from the engine compartment ER, that is, in such a manner as to extend downwards from the lateral side edge 20 of the hood panel 13.

The hinge arm 23 is formed by bending an angle material made of sheet metal and having a horizontal wall portion 23a and a vertical wall portion 23b and is formed into an L-shape as viewed from the side. In addition, the hinge arm 23 allows a rear end 23c side of the vertical wall 23b to be pivotally supported on an engine compartment ER side of the vertical wall portion 22b of the hinge base 22 by making use of a support shaft 21a which is disposed in such a manner that its axis extends in a transverse direction and allows a front end 23d side of the vertical wall portion 23b to be pivotally supported on an engine compartment ER side of the vertical wall portion 26b of the mounting bracket 26 by making use of a support shaft 21b which is disposed in such a manner that its axis extends in the transverse direction. In addition, a rear end 23c side pivot portion which is pivotally supported on the hinge base 22 is made to function as a normal rotation pivot portion 24 which is allowed to rotate both when the front end 17 side of the hood panel 13 is raised when in normal use and when a projection space PS is formed, and a front end 23d side pivot portion which is pivotally supported on the mounting bracket 26 is made to function as a push-up rotation pivot portion 25 which is allowed to rotate only when the projection space PS is formed.

Figure 4A:
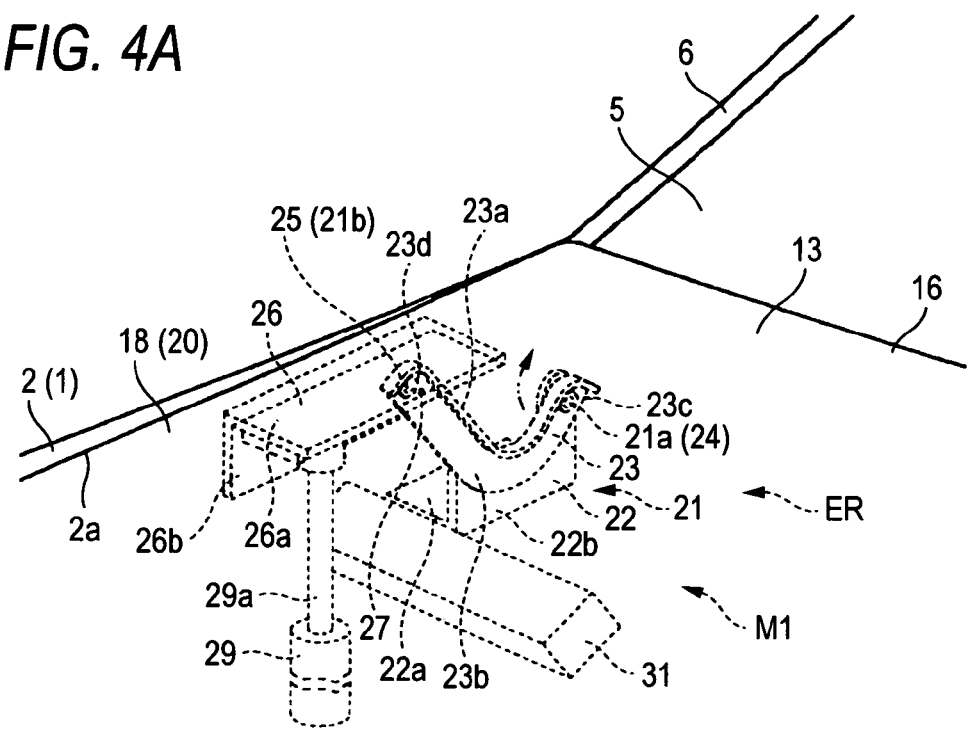
FIGS. 4A and 4B are schematic perspective views which explain an operating state of the first embodiment.
Figure 9:
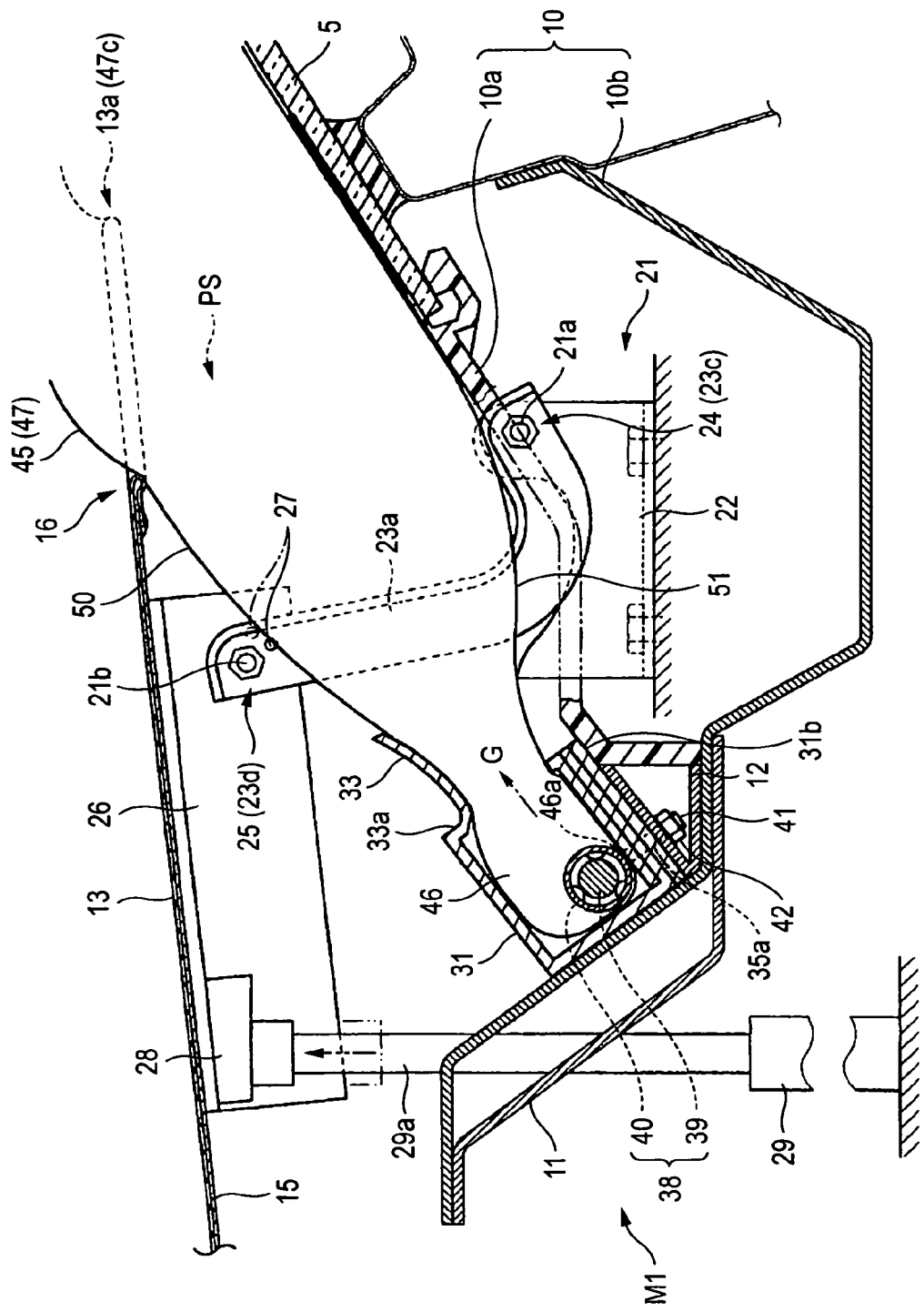
FIG. 9 is a schematic vertical sectional view taken along the longitudinal vehicle showing the operating state of the first embodiment.

In order to prevent the rotational operation of the push-up rotation pivot portion 25 when the hood panel 13 is in normal use, a shear pin 27, which functions as a connecting member which can cancel a connection made thereby, is mounted in such a manner as be passed through the vertical wall portion 26*b* of the mounting bracket 26 and the vertical wall portion 23*b* of the hinge arm 23, so that the mounting bracket 26 and the hinge arm 23 are connected together in such a manner as to be integrated with each other by means of the shear pin 27. Then, when the hood panel 13 is pushed up by a push-up rod 29*a* of the actuator 29, the shear pin 27 is shorn as is shown in FIGS. 4A, 4B and 9, whereby the integration of the mounting bracket 26 with the hinge arm 23 is cancelled, so that the push-up rotation pivot portion 25 allows the hinge arm 23 to rotate relative to the mounting bracket 26 side.

As is shown in FIGS. 2 to 4 and 9, the actuator 29 is configured to include the push-up rod 29*a* whose axis is made to extend in a vertical direction and incorporates a micro gas generator in an interior thereof, and when activated, the actuator 29 makes the push-up rod 29*a* rise and move upwards momentarily. In addition, the actuator 29 is provided at the front of the push-up rotation pivot portion 25 of the hinge arm 23 below the lower surface 15 side of the hood panel 13 near the lateral side edge 20 thereof. In the case of this embodiment, the actuator 29 is fixed at the front of the mounting flange 3 to which the hinge base 22 is fixed in such a manner that the push-up rod 29*a* is brought into abutment with a seat 28 provided on a lower surface of a front end side of the horizontal wall portion 26*a* of the mounting bracket 26. In addition, the push-up rod 29*a* is made only to be brought into abutment with the seat 28 but is not fixed thereto, and when the front end 17 side of the hood panel 13 is raised during normal use, the push-up rod 29*a* is made to leave the seat 28.

In addition, when the actuator 29 is activated and the push-up rod 29*a* is made to rise and move upwards, the vicinity of the rear end 16 of the hood panel 13 is raised (refer to the chain double-dashed lines in FIG. 3 and FIG. 9) about the front end 17 side thereof as a rotation center via the seat 28 lying on the lateral edge 20 side of the hood panel 13 near the rear end 16 thereof, and as this occurs, the shear pin 27 is shorn in such a manner as to cancel the connection between the mounting bracket 26 and the hinge arm 23, whereby the hinge arm 23 rotates relative to the hinge base 22 and the mounting bracket 26 about the normal rotation pivot portion 24 and the push-up rotation pivot portion 25 of the hinge mechanism 21 as rotational centers in such a manner as to raise the front end 23*d* side thereof where the push-up rotation pivot portion 25 resides, and a projection space PS for the air bag 45 is formed between the cowl 10 and the rear end 16 of the hood panel 13.

Figure 4B:
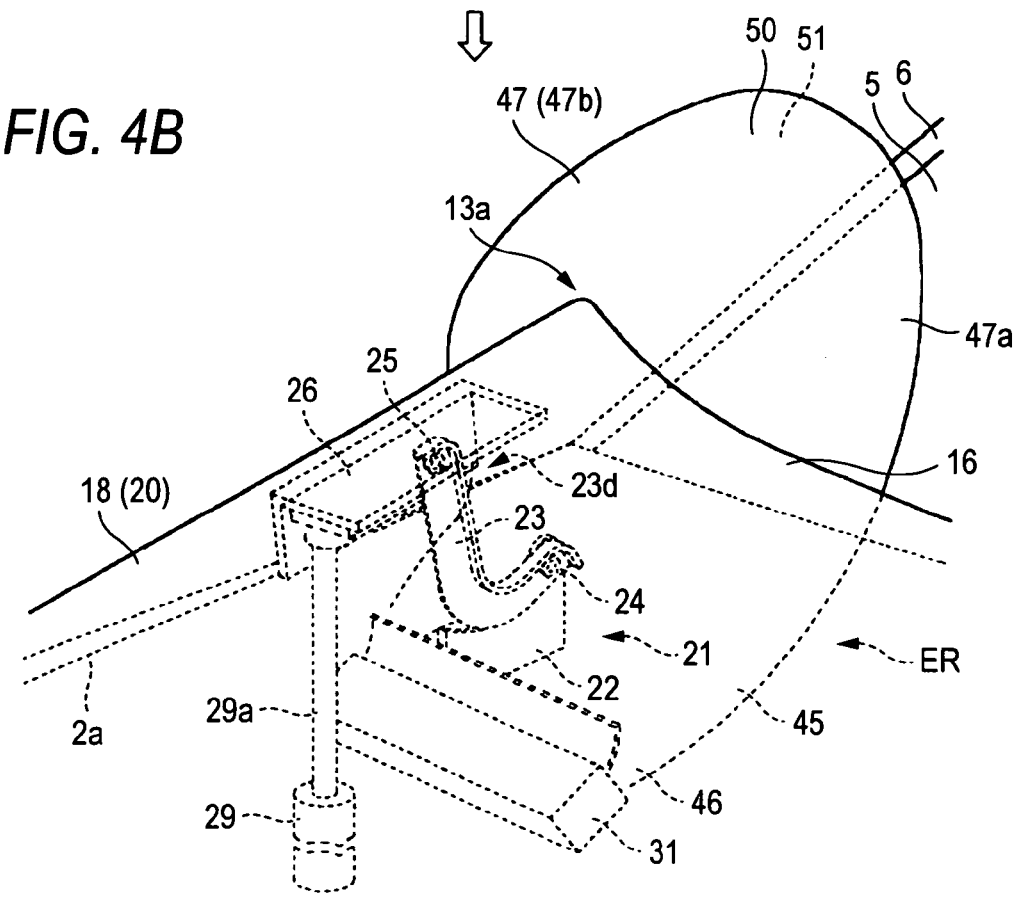

In addition, as is shown in FIG. 2, as a shape as viewed from the top which extends from the rear to the front, the hinge base 22 and the hinge arm 23 are offset in such a manner that the hinge arm 23 and the vertical wall portion 22*b* of the hinge base 22 deviate to be bent towards the engine compartment ER so as to prevent the front end 23*d* side of the hinge arm 23 which projects, as is shown in FIG. 4B, upwards from the fender panel 2 from coming to interfere with an engine compartment ER side edge 2*a* of the fender panel 2 when the front end 23*d* side of the hinge arm 23 rotates upwards about the normal rotation pivot portion 24 during the normal rotation and push-up rotation.

Figure 8A:
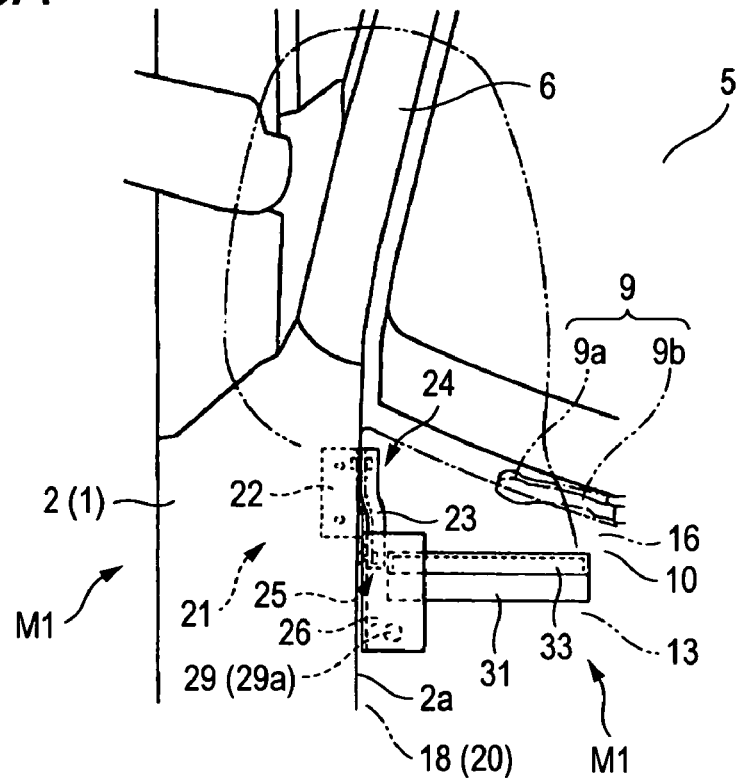
FIGS. 8A and 8B are schematic plan views which explain the operating state of the first embodiment.
Figure 8B:
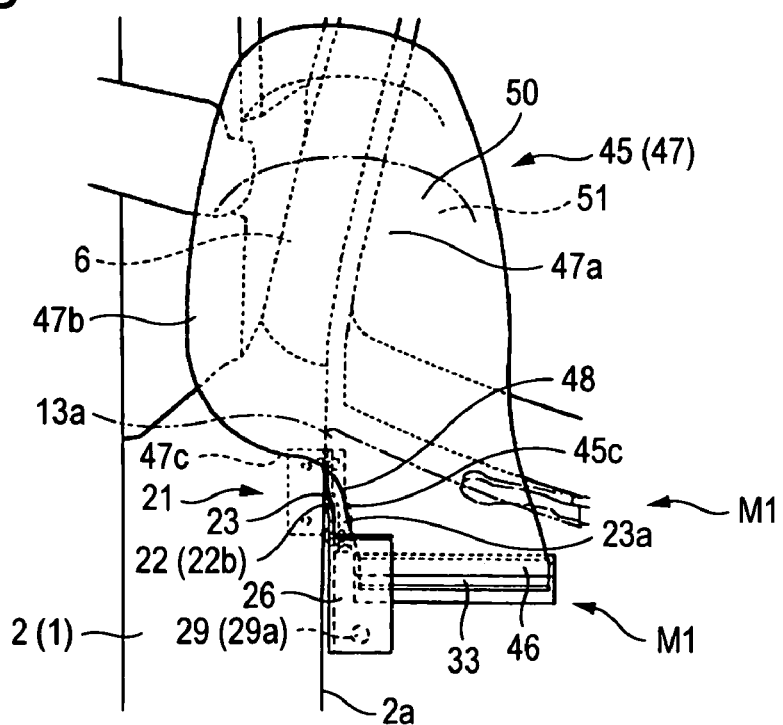

As a shape resulting when completing inflation, the air bag 45 is, as is shown in FIGS. 4B, 8B, formed into the shape of a substantially rectangular plate-like bag which is made up of a proximal portion 46 which is disposed on a front end 45*a* (refer to FIGS. 6A-D) side of the air bag 45 which constitutes a side where the case 31 resides and a main body portion 47 which extends rearwards from the proximal portion 46 so as to cover a front side of a front pillar 6 over an area extending from a lower end part-way up to the vicinity of a vertical intermediate portion of the front pillar 6, and an upper surface side is made to function as a pedestrian side wall portion 50 which receives a pedestrian and a lower surface side of the air bag 45 is made to function as a body side wall portion 51 which is brought into contact with a windshield 5 and the front pillar 6. Furthermore, as the shape resulting when completing inflation, the air bag 45 is configured to include a recessed portion 48 on a proximal portion 46 side of the main body portion 47 which recessed portion 48 is made to follow inner edges (engine compartment ER side edges) of the hinge base 22 and the hinge arm 23 which is raising the push-up rotation pivot portion 25 side thereof. Due to this, the main body portion 47 of the air bag 45 is made up of a rear extending portion 47*a* which extends rearwards from the proximal portion 46 and a side edge portion 47*b* which lies rearwards of the recessed portion 48. In addition, as is shown in FIGS. 6A-6D, 9, mounting holes 46*a* through which bolts 41 of the inflator 38 are made to project are formed in two locations along a lateral direction in the body side wall portion 51 of the proximal portion 46. In addition, the air bag 45 is formed into the bag shape of flexible woven fabric such as polyester or polyamide by making use of, for example, a sewing technique. Then, in the case of the embodiment, when the woven fabric is formed into the bag shape, the inflator 38 is accommodated in the interior of the bag so formed.

Figure 6A:
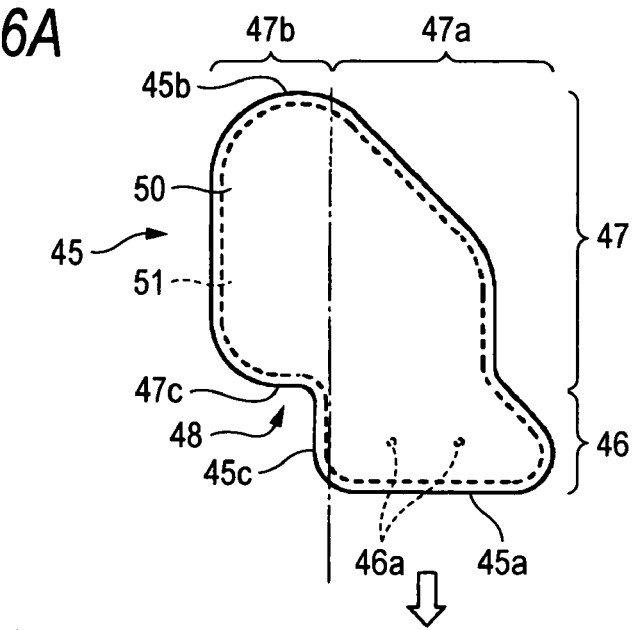
FIGS. 6A to 6D are drawings which explain the folding of an air bag used in the first embodiment.
Figure 6B:
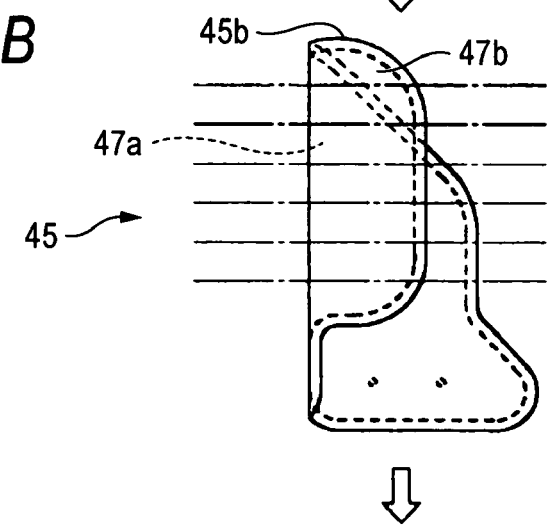
Figure 6C:
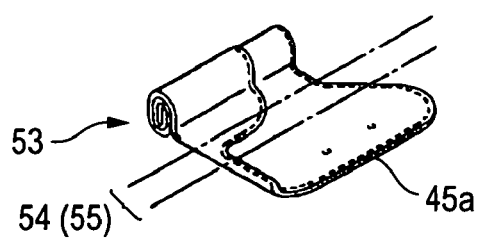
Figure 6D:
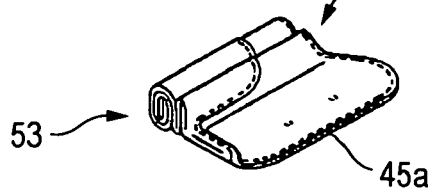

When folding the air bag 45 for accommodation in the case 31, firstly, as is shown in FIG. 6A, the pedestrian side wall portion 50 and the body side wall portion 51 are deployed flat, and as is shown in FIGS. 6A, 6B, on the pedestrian side wall portion 50, the side edge portion 47*b* of the main body portion 47 is folded in such a manner as to ride on the rear extending portion 47*a*. Following this, in order to facilitate the deployment of the air bag 45 along an upper surface of the windshield 5 when the air bag 45 deploys and inflates, as is shown in FIGS. 6B, 6C, a rear end (upper end) 45*b* side of the air bag 45 is roll folded as being wound into a roll on the body side wall portion 51. Thereafter, as is shown in FIGS. 6C, 6D and 3, a corrugated portion 54 where the air bag is corrugated into folds is provided between a roll folded portion 53 and the front end 45*a* to thereby complete the folding of the air bag 45. Note that the corrugated portion 55 is formed over a length which can allow the roll folded portion 53 which projects from the case 31 when the air bag 45 deploys and inflates to override an area where a pivot shaft portion 9*a* and an arm 9*b* (refer to FIG. 2) of a wiper 9 are disposed. In addition, when folding the air bag 45, the air bag 45 is folded with the inflator 38 accommodated therein, and when the folding of the air bag 45 is completed, the folded air bag 45 is wrapped with a wrapping member which prevents the collapse of folds made for accommodation in the case 31.

Figure 7:
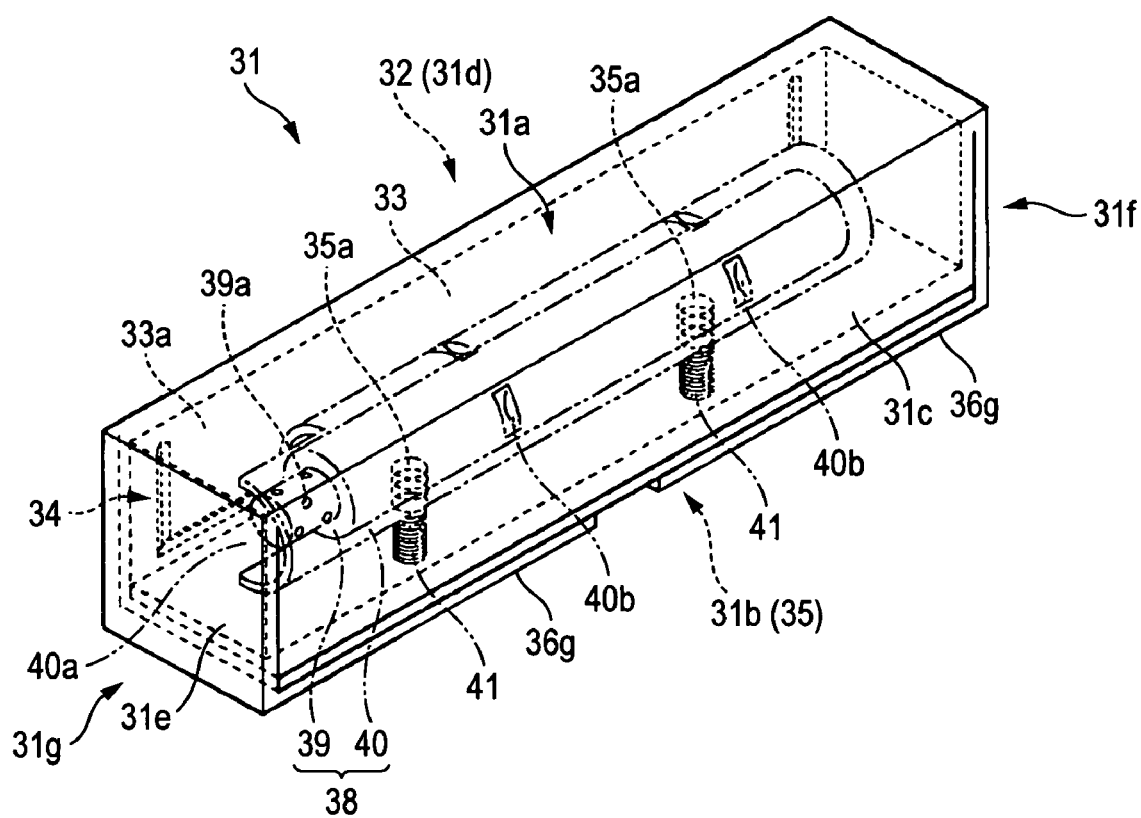
FIG. 7 is a perspective view showing a case of the first embodiment.

As is shown in FIGS. 3, 7, the inflator 38 is configured to include a cylinder-type main body 39 which is disposed in such a manner that an axis thereof extends in the transverse direction and a retainer 40 which mounts the main body 39 together with the air bag 45 in the case 31 while holding the main body 39 and is accommodated within the proximal portion 46 of the air bag 45. The main body 39 has a plurality of gas discharge ports 39*a* from which inflation gas is discharged on the side edge 20 side of the hood panel 13. The retainer 40 is configured to include an opening 40*a* which is formed by cutting out a portion of the retainer 40 which lies rearwards of the gas discharge ports 39a into a half-cut, semi-cylindrical shape. In addition, the retainer 40 includes clasping portions 40b which can clasp and hold the main body 39 and bolts 41 which are provided parallel in the transverse direction on an outer circumferential surface in a location which deviates downwards through 90 degrees from the opening 40a in such a manner as to project therefrom. These bolts 41 pass through the mounting holes 46a formed in the air bag 45 and are then fastened by nuts 42, whereby circumferential edges of the mounting holes 46a of the air bag 45 are attached to the case 31.

The case 31 which accommodates therein the air bag 45 and the inflator 38 is made from synthetic resin and is, as is shown in FIGS. 2, 3, 7, 9, formed into a parallelepiped shape which extends in a lateral direction. In the case 31 so formed, a rear wall 31d is disposed in such a manner as to be oriented in an obliquely rearwards upward direction so that the rear wall 31d functions as an opening wall 32 which is caused to open when the air bag 45 projects from the case 31d. A door portion 33, which is adapted to be pushed to open by the air bag 45 which is inflating, is provided in the opening wall 32. A hinge portion 33a made up of an integral hinge is provided on an upper edge side of the door portion 33, and a thin rupture-predicted portion 34 is provided along a perimeter of the door portion 33 excluding the hinge portion 33a, so that when the air bag 45 deploys and inflates, the door portion 33 ruptures along the rupture-predicted portion 34 to open upwards about the hinge portion 33a as a rotation center, that is, about the upper side thereof.

In addition, in the case 31, a mounting wall portion 35 having mounting holes 35a through which the respective bolts 41 of the retainer 40 are passed is provided on a bottom wall 31b which faces a front ceiling wall 31a which continues to the rear wall 31d. The mounting wall portion 35 is a portion that is to be mounted on the cowl 10, and in the case of this embodiment, the respective bolts 41 of the retainer 40 attach the air bag 45 and the inflator 38 to the case 31 and also function to attach the case 31 to the cowl 10.

Figure 5:
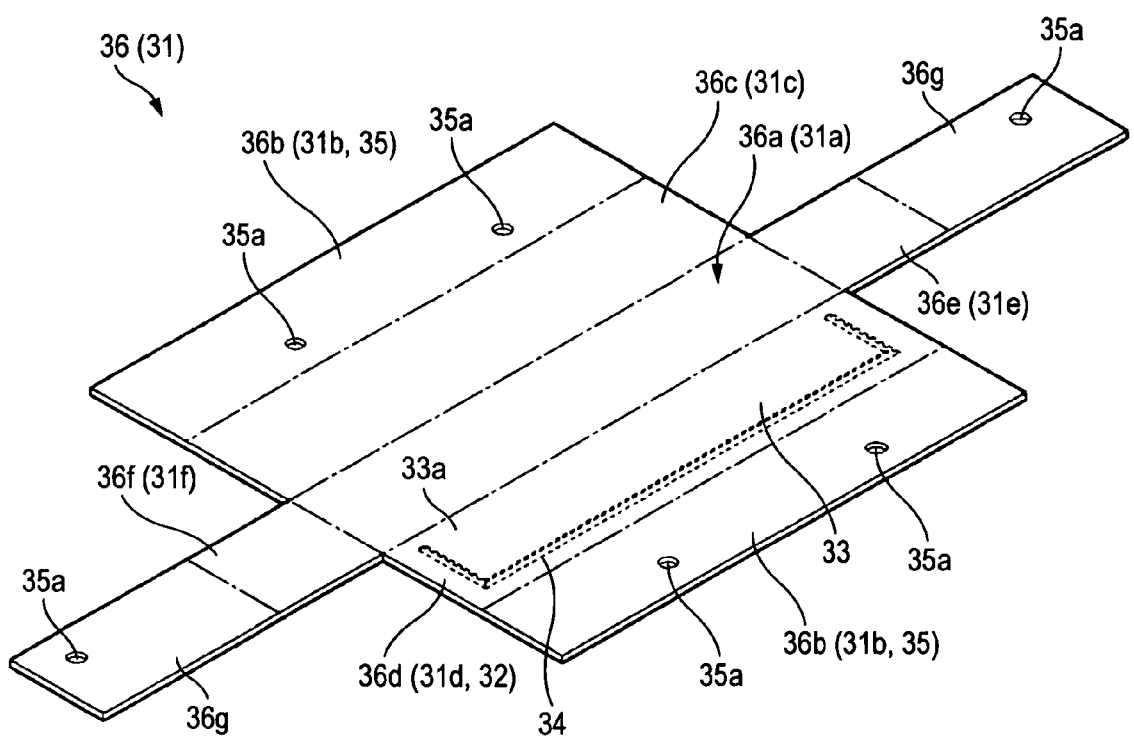
FIG. 5 is a perspective view showing a sheet material for fabricating a case which is used in the pedestrian protection air bag of the first embodiment.

Furthermore, in the case of this embodiment, the case 31 is, as is shown in FIG. 5, formed by folding up a sheet material 36 deployed flat, the sheet material 36 being made from synthetic resin into a sheet-like shape for fabrication of a case. This case-fabricating sheet material 36 includes portions 36a, 36c, 36d, 36e, 36f which correspond, respectively, to the ceiling wall 31a, lower wall 31c, rear wall 31d and left and right side walls 31e, 31f of the case 31, as well as portions 36b which correspond to the bottom wall 31b, the portions 36 being provided two so that the portions 36 can be superposed on each other so as to form double layers which are fastened together by the bolts 41. The case-fabricating sheet material 36 further includes extended portions 36g which can be fastened together with the bottom wall 31b to the portions 36e, 36f which correspond to the side walls 31e, 31f by making use of the bolts 41.

In addition, as is shown in FIG. 2, the case 31 is disposed, as is viewed from the top, at the front of the hinge base 22 and at the rear of the push-up rod 29a of the actuator 29 within the region of the hood panel 13 with the side wall 31e which constitutes a lateral outer edge 31g side of the case 31 disposed near the lateral side edge 20 of the hood panel 13 near the rear end thereof.

A portion on the cowl 10 on which the case 31 is mounted is, as is shown in FIG. 3, is a metallic cowl panel 10b, and the case 31 is mounted on the cowl panel 10b by making use of a support bracket 12 of an L-shaped cross section which is secured to the cowl panel 10b. Furthermore, a metallic reinforcement material (a reinforcement plate) 11 is secured on the portion of the cowl panel 10b where the case 31 is secured thereto for reinforcement on a front side which is situated in an opposite direction to the direction in which the air bag 45 projects. In addition, the cowl 10 also includes a synthetic resin cowl louver 10a which is provided upwards of the cowl panel 10b in such a manner as to be directed from an upper surface side of the windshield 5 obliquely forwards downwards so as to moderately continue to the bottom wall 31b lying on the lower edge side of the opening wall 32 of the case 31. The cowl louver 10a is notched in the vicinity of the hinge base 22 in order to avoid the interference with the hinge arm 23.

In the pedestrian protection air bag system M1 according to the first embodiment, when in operation, as is shown in FIGS. 3, 4A, 4B, 9, the actuator 29 raises the push-up rod 29a which is kept in abutment with the seat 28 o the lower surface 15 side of the hood panel 13 near the lateral side edge 20 near the rear end 16 thereof so as to form a projection space SP for the air bag 45. As this occurs, in the hinge mechanism 21, the shear pin 27 is shorn, and the hinge arm 23 raises the push-up rotation pivot portion 25 side which is the rear end 23c side thereof obliquely forwards upwards from the normal rotation pivot portion 24 side while allowing both the normal rotation pivot portion 24 and the push-up rotation pivot portion 25 to rotate relative to the hinge base 22 and the mounting bracket 26, respectively.

Then, as is shown in FIGS. 4A, 4B, 9, the air bag 45 introduces thereinto inflation gas G which is discharged from the gas discharge ports 39a of the inflator 38, pushes to open the door portion 33 so as to project rearwards from the opening wall 32 of the case 31, and eventually deploys and inflates. As this occurs, as is shown in FIGS. 8A, 8B, the air bag 45 is configured to include the recessed portion 48 which is made to follow the inner edges of the hinge base 22 and the hinge arm 23 which is raising the push-up rotation pivot portion 25 side thereof on the proximal portion 46 side of the main body portion 47, and hence, the air bag 45 deploys and inflates smoothly and quickly without avoiding the interference with the hinge mechanism 21 as much as possible. Of course, the actuator 29 which raises the hood panel 13 is disposed at the front of the case 31, and hence, there is no fear that the air bag 45 which deploys and inflated rearwards from the proximal portion 46 side comes to interfere with the push-rod 29a of the actuator 29 so disposed.

Furthermore, as is shown in FIG. 2, the case 31 which accommodates and holds the air bag 45 therein is provided, as is viewed from the top, at the front of the hinge base 22 and at the rear of the push-up rod 29a of the actuator 29 within the region of the hood panel 13 with the lateral outer edge 31g thereof disposed to the side edge 20 of the hood panel 13 near the rear end 16 thereof. Due to this configuration, in the airbag 45 which has completed deployment and inflation, as viewed from the top shown in FIG. 8B, the lateral side edge 45c of the proximal portion 46 side of the air bag 45 which is mounted on the cowl 10 together with the case 31 is allowed to be disposed to approach the lateral side edge 20 of the hood panel 13 near the rear end 16 thereof, that is, the lateral side edge 45c of the proximal portion 46 which includes the recessed portion 48 which is recessed towards the lateral center of the hood panel 13 is allowed to be disposed to approach the location lying directly below the front pillar 6 (directly below on the front side of the front pillar 6), so that the main body portion 47 which has the side edge portion 47b which is situated upwards of the recessed portion and is formed to project transversely outwards from the front side of the front pillar 6 can cover the front side of the front pillar 6 widely and stably with the area which expands from the rear extending portion 47a which lies rearwards of the proximal portion 46 to the side edge portion 47b.

Furthermore, in the air bag 45 which has completed deployment and inflation, a circumferential edge of the recessed portion 48 which lies near a front end (a lower end) 47c of the side edge portion 47b inflates in such a manner as to wrap round a corner portion 13a which constitutes an intersecting portion between the rear end 16 and the side edge 20 of the hood panel 13 (refer to FIGS. 8B, 9), thereby making it possible to protect a pedestrian from the corner portion 13a.

In addition, as is shown in FIGS. 2, 3, 9, the actuator 29 is provided at the front of the push-up rotation pivot portion 25 of the hinge arm 23 below the lower surface 15 of the hood panel 13 near the lateral side edge 20, whereby the actuator 29 is disposed further forwards than the rear end 16 of the hood panel 13 where the hinge mechanism 21 is provided. Due to this configuration, only by raising the push-up rod 29a a distance as an operation stroke L1 which is smaller than an open distance L0 (refer to FIG. 3) between the position where the hood panel 13 on which the hinge mechanism 21 is disposed takes when the projection space SP for the air bag 45 is formed between the cowl 10 and the rear end 16 of the hood panel 13 and the cowl 10, the projection space PS of a predetermined quantity can be formed, and the external shape including the vertical length of the push-up rod 29a can be made compact.

Furthermore, the case 31 which accommodates therein the folded air bag 45 is also, as is viewed from the top shown in FIG. 2, is provided at the front of the hinge base 22 and at the rear of the push-up rod 29a of the actuator 29 within the region of the hood panel 13 with the lateral outer edge 31g disposed near the lateral side edge 20 of the hood panel 13 near the rear end thereof. Namely, in the pedestrian protection airbag system M1 of the first embodiment, the hinge base 22 of the hinge mechanism 21, the case 31 which accommodates therein the air bag 45 and the actuator 29 can be disposed close to each other sequentially in that order, and therefore, the overall constituent components of the air bag system can be fitted over the compact area near the lateral side edge 20 of the hood panel 13 at the rear end 16 thereof.

Consequently, in the pedestrian protection air bag system M1 of the first embodiment, also on the right edge 19 side as with the left edge 18 side of the hood panel 13, the air bag 45 can deploy and inflate quickly so as to cover the front side of the front pillar 6 in a stable fashion, and the overall constituent components of the air bag system on the relevant side can also be fitted while saving the space in the relevant area of the vehicle.

Second Embodiment

Figure 10:
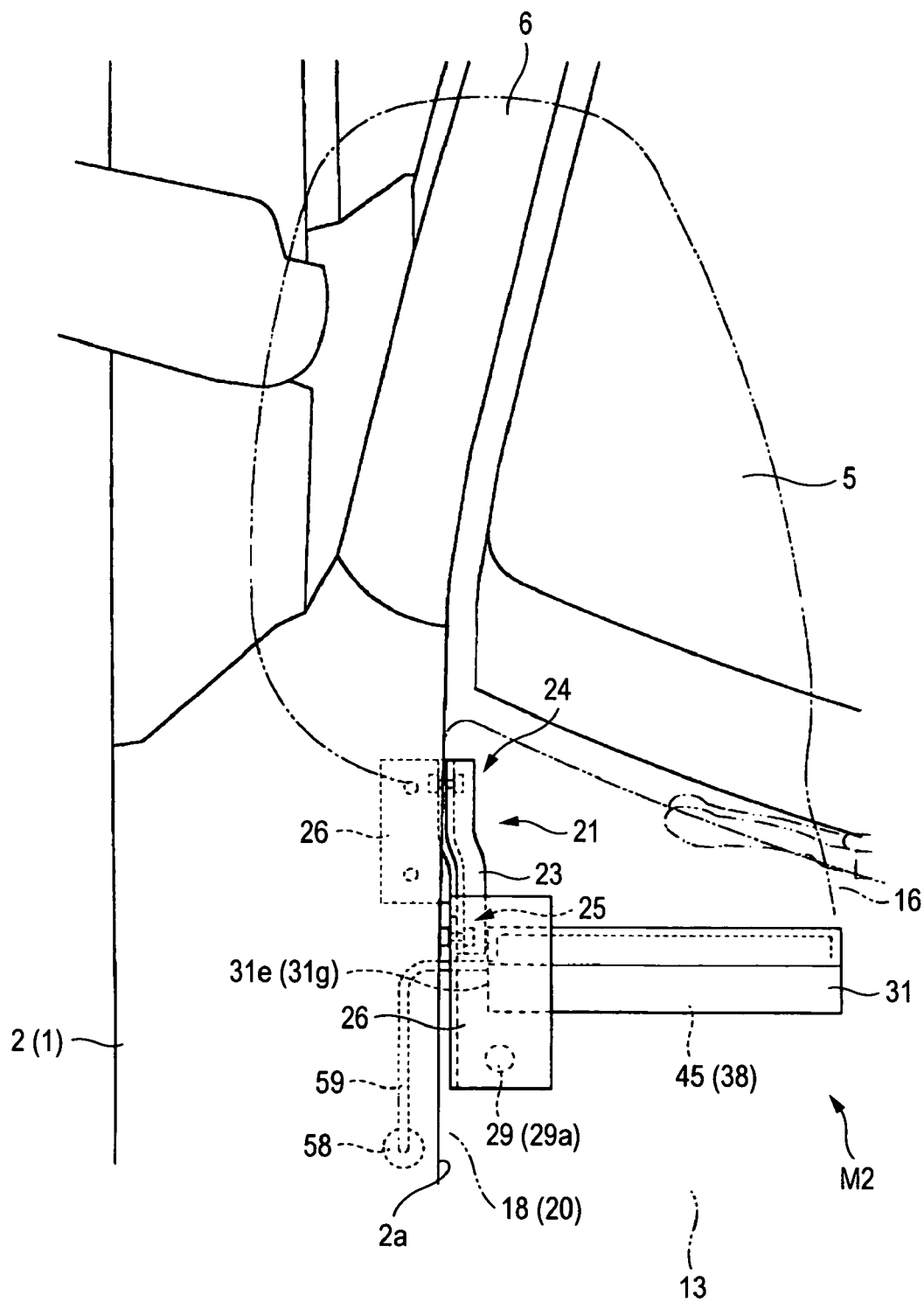
FIG. 10 is an enlarged plan view showing a pedestrian protection air bag system of a second embodiment.
Figure 11:
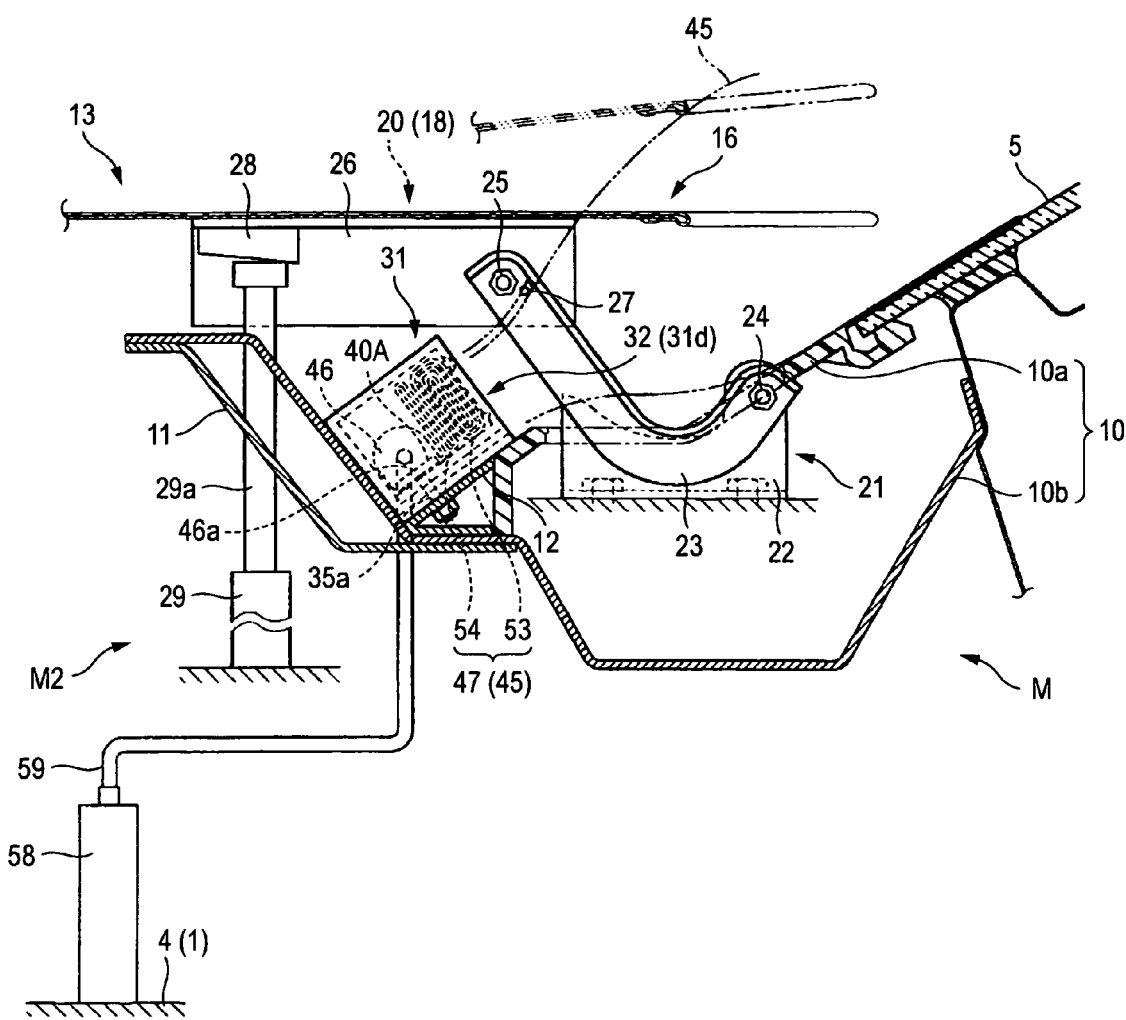
FIG. 11 is a schematic vertical sectional view of the pedestrian protection air bag system of the second embodiment taken along the longitudinal direction of the vehicle.

In addition, in the pedestrian protection air bag system M1 of the first embodiment, while the inflator 38 for supplying inflation gas G to the air bag 45 is described as being accommodated within the case 31 together with the air bag 45, as with a pedestrian protection air bag system M2 of a second embodiment shown in FIGS. 10, 11, a supply pipe ling 59 for supply inflation gas G to an air bag 45 may be provided as an inflator 58 and be fixed to a body 1 side of the vehicle outside a case 31. Incidentally, in the event that the inflator 58 is configured to include the supply pipe line 59 for supplying the inflation gas G to the air bag 45, since the inflator 58 can be disposed in a location which is apart from the hood panel 13 and the cowl 10, the degree of freedom in arrangement of the inflator 58 can be enhanced. In addition, in the case of the second embodiment, the inflator 58 is fixed to a hood ridge reinforcement 4 on the body 1 side. Additionally, the second embodiment differs from the first embodiment in that the second embodiment includes the supply pipe ling 59 which establishes a communication between the inflator 58 and a proximal portion 46 of the air bag 45 and a retainer 40A which includes bolts 41 for attaching the air bag 45 to the case 31 is formed into a plate-like shape which can hold circumferential edges of mounting holes 46a in the air bag 45, and the air bag 45, the case 31 and the other constituent components of the second embodiment are similar to those of the first embodiment, whereby a similar function and advantage to those provided by the first embodiment can also be provided by the second embodiment.

Figure 12:
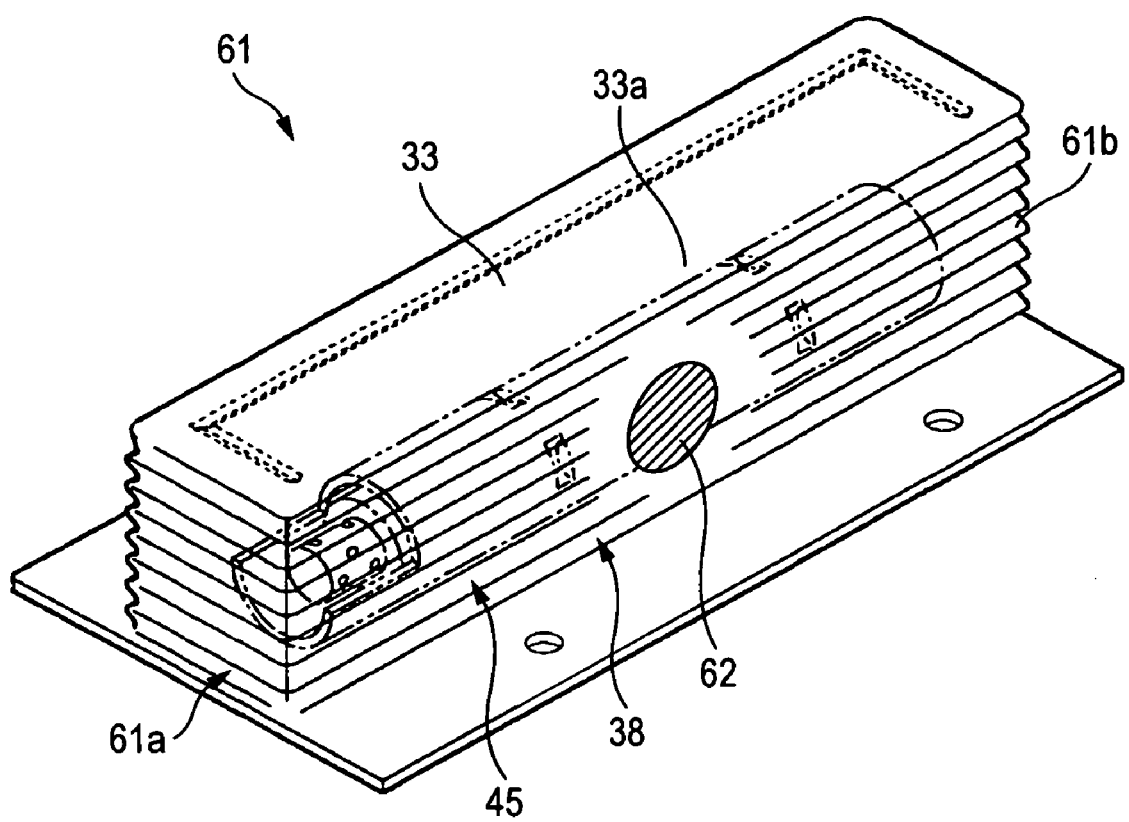
FIG. 12 is a perspective view showing a modified example to the case used in the first embodiment.

In addition, as the case which accommodates the folded air bag 45 and the inflator 38, since the case is mounted on the cowl 10 below the hood panel 13 which is easily exposed to rain water, a case 61 shown in FIG. 12 may be used. This case 61 is configured to include an opening and closing valve 62 which enables the discharge and introduction of air while securing the water-tightness, and a corrugated portion 61b which is adapted to freely expand and contract is disposed in a circumferential wall portion 61a so as to change the volume of the case 61. In the case 61 configured like this, while preventing the intrusion of rainwater thereinto, inside air can be expelled while outside air can be taken in according to a change in temperature in the case 61, thereby making it possible to prevent the deterioration of the air bag 45 and the inflator 38 which are accommodated in the case 61. In addition, this case 61 may be configured to accommodate only the air bag 45 in order to be applied to the second embodiment.

Third Embodiment

Herebelow, a third embodiment of the invention will be described based on the drawings. As is shown in FIGS. 13 to 15, a pedestrian protection air bag system M of the third embodiment of the invention includes, near each of left edge 118 and right edge 119 at a rear end 116 of a hood panel 113 of a vehicle V, an air bag 144, an inflator 138 for supplying inflation gas to the air bag 144, a case 131 which accommodates therein the air bag 144 and the inflator 138, an actuator 129 for raising the rear end 116 of the hood panel 113 and a hinge mechanism 121 which supports the hood panel 113 and guides the rotational movement of the hood panel 113.

Figure 15:
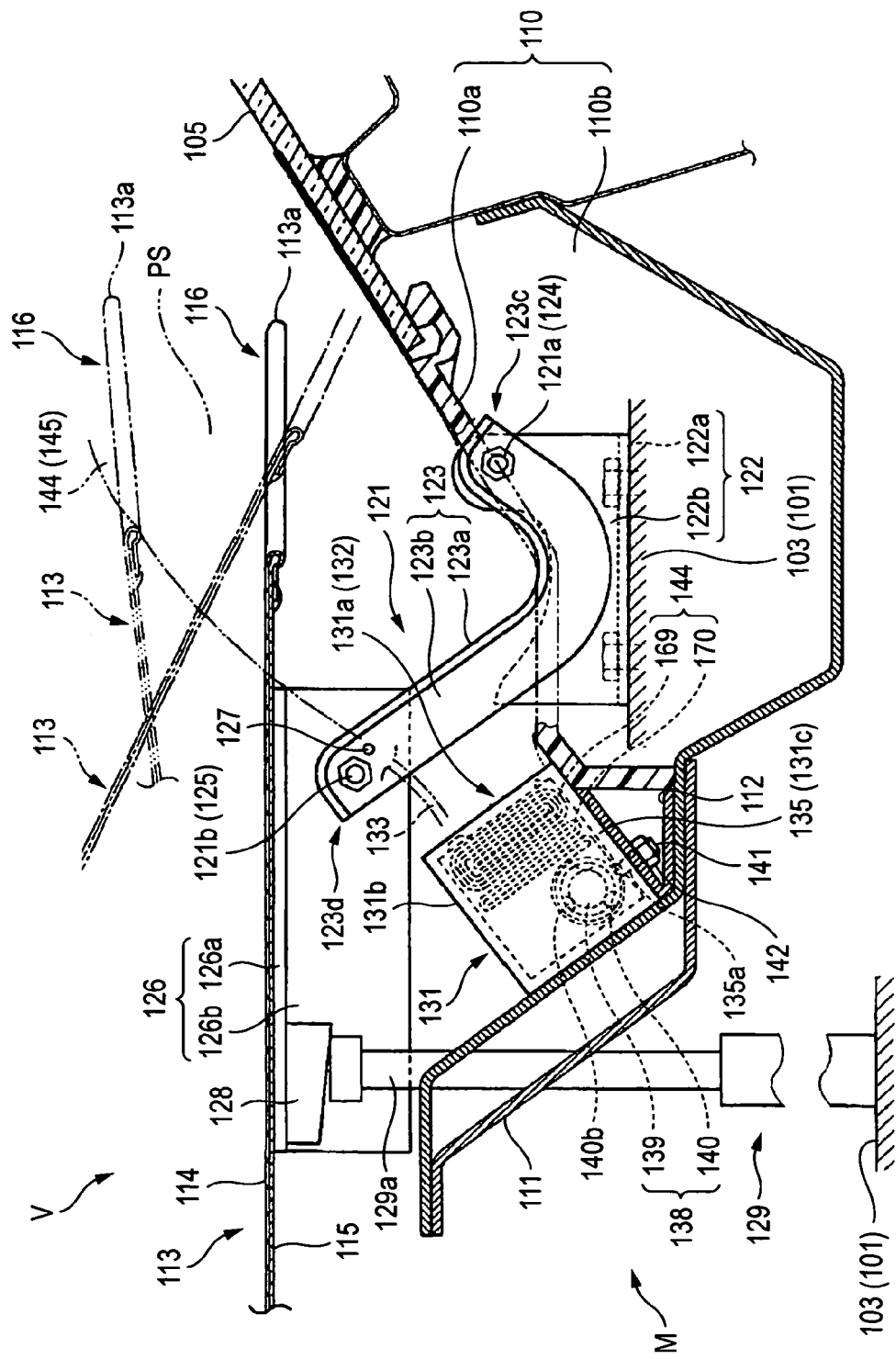
FIG. 15 is a schematic vertical sectional view of the pedestrian protection air bag of the third embodiment taken along a longitudinal direction of the vehicle, which corresponds to a sectional view taken along the line III-III in FIG. 14.

The hood panel 113, which is made of sheet metal and is provided to be placed over an engine compartment ER of the vehicle V to cover the same, is connected to a body 101 of the vehicle V by hinge mechanisms 121 which are disposed near the rear end 116 on both the lateral edge sides (the left edge 118 and the right edge 119) thereof in such a manner that when in normal use, the hood panel 113 can open at the front thereof as indicated by alternate long and short dash lines in FIG. 15 and that when the air bags 144 deploy and inflate, the hood panel 113 can be raised on a rear end 116 side thereof as is indicated by chain double-dashed lines in FIG. 15 so as to form a projection space PS for the air bags 144 to project therethrough between the cowl 110 and the rear end 116 of the hood panel 113. In addition, when the rear end 116 side is raised, a front end 117 side of the hood panel 113 is formed on a body 101 side of the vehicle V in such a manner as to be opened and closed, and the rear end 116 is raised about the front end 111 side as a rotation center.

Figure 13:
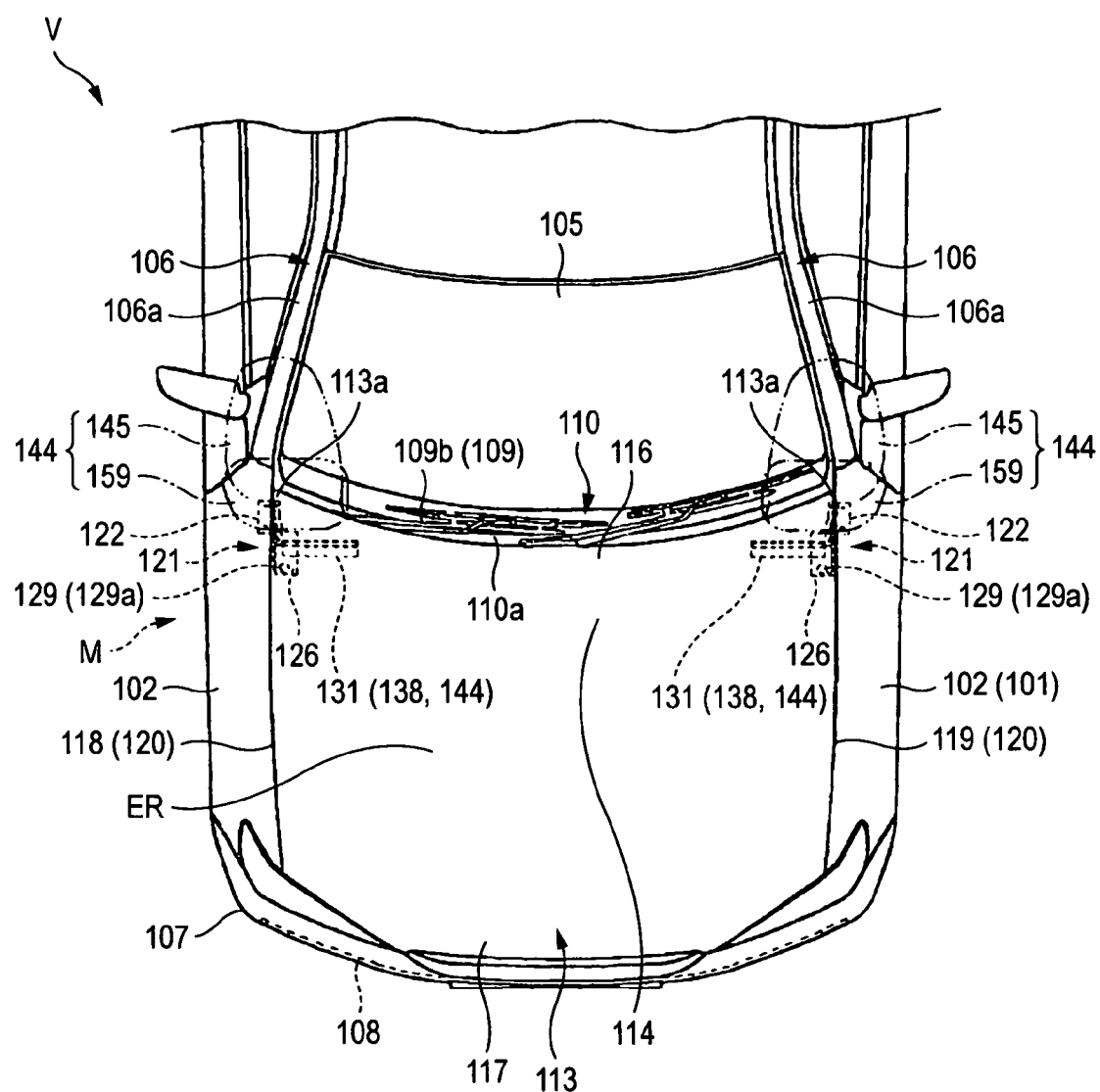
FIG. 13 is a plan view of a vehicle on which a pedestrian protection air bag system which is a third embodiment of the invention is fitted.
Figure 14:
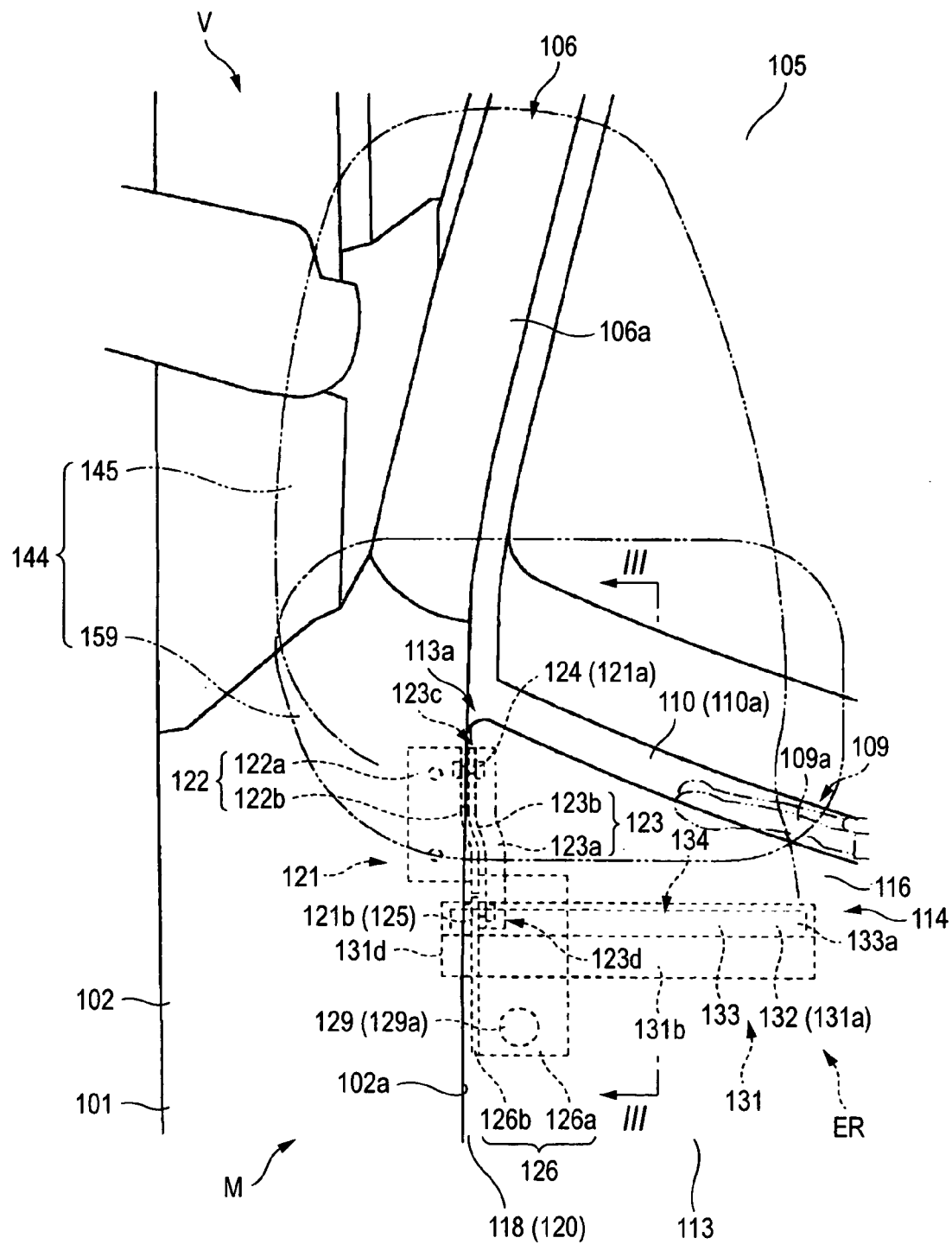
FIG. 14 is an enlarged plan view of the vehicle on which the pedestrian protection air bag system of the third embodiment is fitted.

In addition, as is shown in FIG. 13, a sensor 108 for detecting a collision with a pedestrian is provided on a front bumper 107, and when an activation circuit, not shown, into which signals from the sensor 108 are designed to be inputted detects a collision with a pedestrian based on a signal from the sensor 108, the inflator 138 and the actuator 129 (refer to FIGS. 14, 15) for raising the rear end 116 of the hood panel 113 are designed to be activated.

In this specification, longitudinal (front, rear) and vertical (up, down) directions are based on directions which match the longitudinal and vertical directions of the vehicle, and a lateral (left, right) direction is based on a direction which matches the lateral direction of the vehicle when the viewer is standing to face the front of the vehicle.

In addition, the constituent components such as the air bags 144 of the pedestrian protection air bag system M which are disposed on the left and right sides of the hood panel 113 at the rear end 116 thereof are disposed transversely symmetrical, and in the following description, the constituent components of the pedestrian protection air bag system M which are disposed on the left hand side of the vehicle V will be described. However, the respective constituent components which are disposed on the right-hand side and components provided on the body 101 in the vicinity of the fitting position of the right-hand side constituent components are transversely symmetrical with those provided on the left-hand side unless otherwise described, and hence, the description of these right-hand side components will be omitted here. In addition, the left edge 118 and the right edge 119 which constitute the lateral or left and right edges of the hood panel 113 will be described as a side edge 120 unless otherwise described.

As is shown in FIGS. 14, 15, 21, the hinge mechanism 121 is configured to include a hinge base 122 which is fixed to the body 101 side or a body 1 side of the vehicle V, amounting bracket 126 which is fixed to the hood panel 113 or a hood panel 113 side of the vehicle, and a hinge arm 123 which is pivotally supported on the hinge base 122 and the mounting bracket 126 for free rotation thereon.

The hinge base 122 is made of sheet metal and is made up of a horizontal wall portion 122a and a vertical wall portion 122b which are provided in such a manner as to form an L-shaped transverse cross section. The hinge base 122 is fixed to the body 110 side of the vehicle V in a location which lies, as viewed from the top, at the rear end 116 of the hood panel 113 and transversely slightly outboards of the lateral side edge 120. The horizontal wall portion 122a is fixedly mounted on a mounting flange 103 of a body 101 side fender panel 102 which extends towards the engine compartment ER, and the vertical wall portion 122b is provided in such a manner as to extend upwards from an engine compartment ER side of the horizontal wall portion 122a.

The mounting bracket 126 is made of sheet metal and is made up of a horizontal wall portion 126a and a vertical wall portion 126b which are provided in such a manner as to form an inverted L-shaped transverse cross section. The hinge base 126 is fixed to the hood panel 113 side of the vehicle V in a location which lies, as viewed from the top, at the front of the hinge base 122 within the region of the hood panel 113. The horizontal wall portion 126a is fixedly mounted on a lower surface 115 of the hood panel 113 in a location lying at the rear end 116 near the lateral side edge 120 thereof, and the vertical wall portion 126b is provided in such a manner as to extend downwards from an edge of the horizontal wall portion 126a which lies apart from the engine compartment ER, that is, in such a manner as to extend downwards from the lateral side edge 120 of the hood panel 113.

The hinge arm 123 is formed by bending an angle material made of sheet metal and having a horizontal wall portion 123a and a vertical wall portion 123b and is formed into an L-shape as viewed from the side. In addition, the hinge arm 123 allows a rear end 123c side of the vertical wall 123b to be pivotally supported on an engine compartment ER side of the vertical wall portion 122b of the hinge base 122 by making use of a support shaft 121a which is disposed in such a manner that its axis extends in a transverse direction and allows a front end 123d side of the vertical wall portion 123b to be pivotally supported on an engine compartment ER side of the vertical wall portion 126b of the mounting bracket 126 by making use of a support shaft 121b which is disposed in such a manner that its axis extends in the transverse direction. In addition, a rear end 123c side pivot portion which is pivotally supported on the hinge base 122 is made to function as a normal rotation pivot portion 124 which is allowed to rotate both when the front end 117 side of the hood panel 113 is raised when in normal use and when a projection space PS is formed, and a front end 123d side pivot portion which is pivotally supported on the mounting bracket 126 is made to function as a push-up rotation pivot portion 125 which is allowed to rotate only when the projection space PS is formed.

In order to prevent the rotational operation of the push-up rotation pivot portion 125 when the hood panel 113 is in normal use, a shear pin 127, which functions as a connecting member which can cancel a connection made thereby, is mounted in such a manner as be passed through the vertical wall portion 126b of the mounting bracket 126 and the vertical wall portion 123b of the hinge arm 123, so that the mounting bracket 126 and the hinge arm 123 are connected together in such a manner as to be integrated with each other by means of the shear pin 127. Then, when the hood panel 113 is pushed up by a push-up rod 129a of the actuator 129, the shear pin 127 is shorn as is shown in FIG. 21, whereby the integration of the mounting bracket 126 with the hinge arm 123 is cancelled, so that the push-up rotation pivot portion 125 allows the hinge arm 123 to rotate relative to the mounting bracket 126 side.

As is shown in FIGS. 14, 15, 21A and 21B, the actuator 129 is configured to include the push-up rod 129a whose axis is made to extend in a vertical direction and incorporates a micro gas generator in an interior thereof, and when activated, the actuator 129 makes the push-up rod 129a rise and move upwards momentarily. In addition, the actuator 129 is provided at the front of the push-up rotation pivot portion 125 of the hinge arm 123 below the lower surface 115 side of the hood panel 113 near the lateral side edge 120 thereof. In the case of this embodiment, the actuator 129 is fixed at the front of the mounting flange 103 to which the hinge base 122 is fixed in such a manner that the push-up rod 129a is brought into abutment with a seat 128 provided on a lower surface of a front end side of the horizontal wall portion 126a of the mounting bracket 126. In addition, the push-up rod 129a is made only to be brought into abutment with the seat 128 but is not fixed thereto, and when the front end 117 side of the hood panel 113 is raised during normal use, the push-up rod 129a is made to leave the seat 128.

In addition, when the actuator 129 is activated and the push-up rod 129a is made to rise and move upwards, the vicinity of the rear end 116 of the hood panel 113 is raised (refer to the chain double-dashed lines in FIG. 15 and FIG. 21A, 21B) about the front end 117 side thereof as a rotation center via the seat 128 lying on the lateral edge 120 side of the hood panel 113 near the rear end 16 thereof, and as this occurs, the shear pin 127 is shorn in such a manner as to cancel the connection between the mounting bracket 126 and the hinge arm 123, whereby the hinge arm 123 rotates relative to the hinge base 122 and the mounting bracket 126 about the normal rotation pivot portion 124 and the push-up rotation pivot portion 125 of the hinge mechanism 121 as rotational centers in such a manner as to raise the front end 123*d* side thereof where the push-up rotation pivot portion 125 resides, and a projection space PS for the air bag 144 is formed between the cowl 110 and the rear end 116 of the hood panel 113.

In addition, as is shown in FIG. 14, as a shape as viewed from the top which extends from the rear to the front, the hinge base 122 and the hinge arm 123 are offset in such a manner that the hinge arm 123 and the vertical wall portion 122*b* of the hinge base 122 deviate to be bent towards the engine compartment ER so as to prevent the front end 123*d* side of the hinge arm 123 which projects upwards from the fender panel 102 from coming to interfere with an engine compartment ER side edge 102*a* of the fender panel 102 when the front end 123*d* side of the hinge arm 123 rotates upwards about the normal rotation pivot portion 124 during the normal rotation and push-up rotation.

Figure 16:
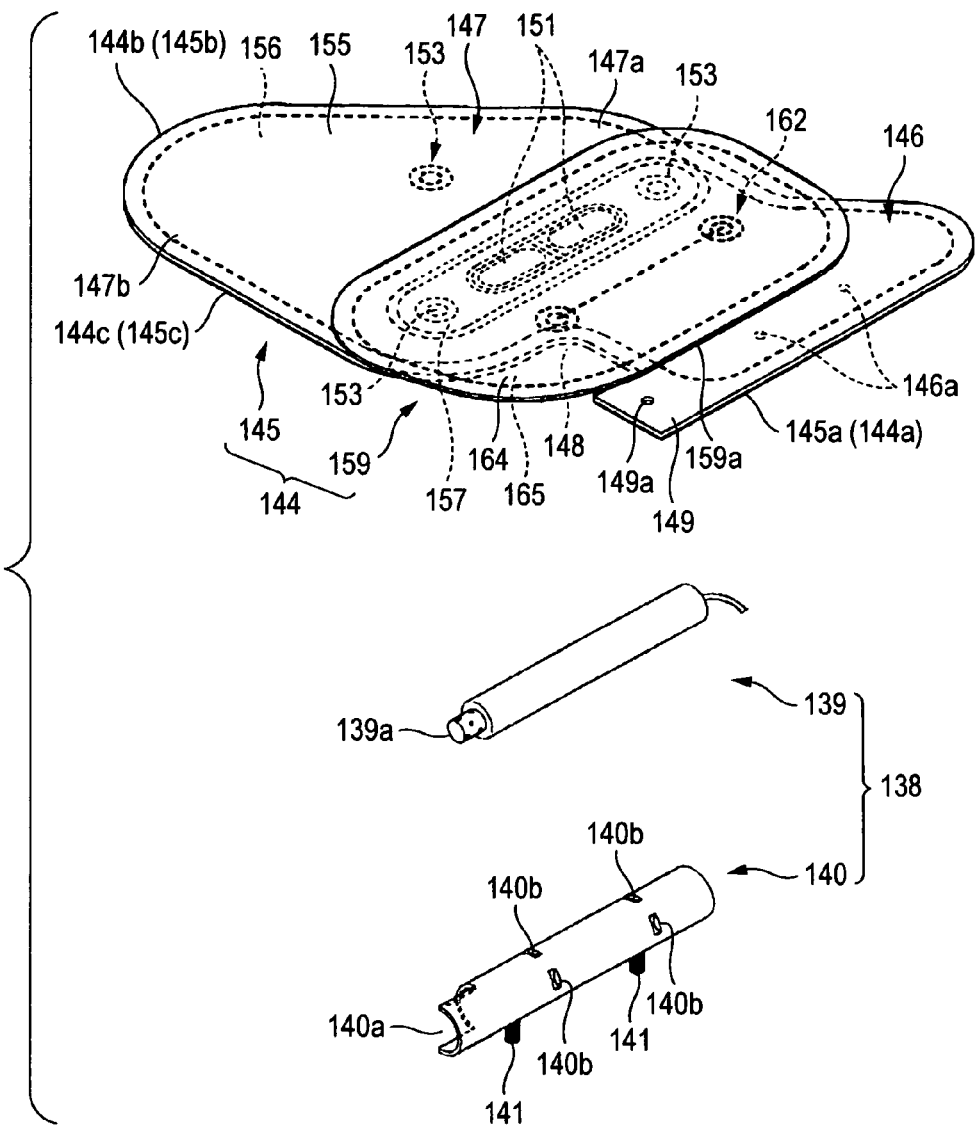
FIG. 16 is a schematic perspective view of an air bag and an inflator which are used in the pedestrian protection air bag system of the third embodiment.

As is shown in FIGS. 15, 16, the inflator 138 is configured to include a cylinder-type main body 139 which is disposed in such a manner that an axis thereof extends in the transverse direction and a retainer 140 which mounts the main body 139 together with the air bag 144 in the case 131 while holding the main body 139 and is accommodated within a proximal portion 146 of a lower inflation portion 145 of the air bag 144. The main body 139 has a plurality of gas discharge ports 139*a* from which inflation gas is discharged on the side edge 120 side of the hood panel 113. The retainer 140 is configured to include an opening 140*a* which is formed by cutting out a portion of the retainer 140 which lies rearwards of the gas discharge ports 139*a* into a half-cut, semi-cylindrical shape. In addition, the retainer 140 includes clasping portions 140*b* which can clasp and hold the main body 139 and bolts 141 which are provided parallel in the transverse direction on an outer circumferential surface in a location which deviates downwards through 90 degrees from the opening 140*a* in such a manner as to project therefrom. These bolts 141 pass through the mounting holes 146*a* formed in the air bag 144 and are then fastened by nuts 142, whereby circumferential edges of the mounting holes 146*a* of the air bag 144 are attached to the case 131.

Figure 23:
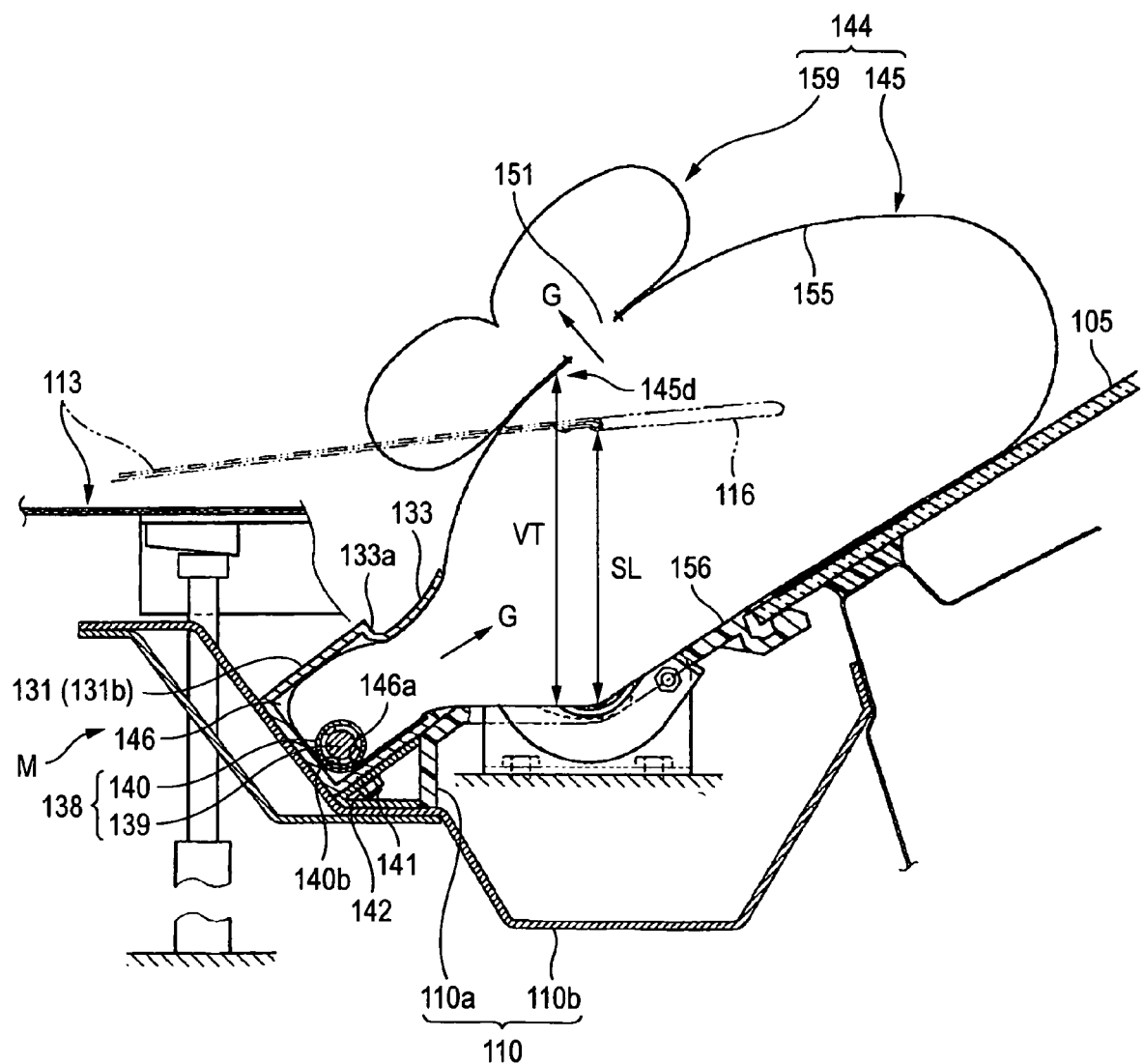
FIG. 23 is a schematic vertical sectional view showing an inflated state of the air bag of the third embodiment in such a state that a hood panel does not exist.

The case 131 which accommodates therein the air bag 144 and the inflator 138 is, as is shown in FIGS. 14, 15, 23, formed from synthetic resin into a parallelepiped shape which extends in a lateral direction. In the case 131 so formed, a rear wall 131*d* is disposed in such a manner as to be oriented in an obliquely rearwards upward direction so that the rear wall 131*d* functions as an opening wall 132 which is caused to open when the air bag 144 projects from the case 131*d*. A laterally elongated rectangular plate-shaped door portion 133, which is adapted to be pushed to open by the air bag 144 which is inflating, is provided in the opening wall 132. A hinge portion 133*a* made up of an integral hinge is provided on an upper edge side of the door portion 133, and a thin rupture-predicted portion 134 is provided along a perimeter of the door portion 133 excluding the hinge portion 133*a*, so that when the air bag 145 deploys and inflates, the door portion 133 ruptures along the rupture-predicted portion 134 to open upwards about the hinge portion 133*a* as a rotation center, that is, about the upper side thereof. In addition, the case 131 is formed into a box-like shape by folding up a predetermined synthetic resin sheet which is deployed flat and welding, bonding or bolting with bolts 141 the synthetic resin sheet which has now been built up.

In addition, in the case 131, a mounting wall portion 135 having mounting holes 135*a* through which the respective bolts 141 of the retainer 140 are passed is provided on a bottom wall 131*c* which faces a front ceiling wall 131*a* which continues to the rear wall 131*d*. The mounting wall portion 135 is a portion that is to be mounted on the cowl 110, and in the case of this embodiment, the respective bolts 141 of the retainer 140 attach the air bag 144 and the inflator 138 to the case 131 and also function to attach the case 131 to the cowl 110. In addition, in the case of this embodiment, the air bag 144 includes a side edge mounting portion 149 which is spaced apart from the inflator 138 to the side edge 120 side (refer to FIGS. 16, 21A, 21B), and the air bag 144 is also attached to the case 131 and then to the cowl 110 with a bolt, not shown, which is passed through a side edge mounting hole 149*a* provided in the side edge mounting portion 149.

In addition, the case 131 is, as is viewed from the top shown in FIG. 14, provided at the front of the hinge base 122 and at the rear of the push-up rod 129*a* of the actuator 129 with a side which faces a lateral outer side wall 131*d* disposed to the lateral side edge 120 of the hood panel 113 near the rear end 116 thereof.

A portion on the cowl 110 on which the case 131 is mounted is, as is shown in FIG. 15, a metallic cowl panel 110*b*, and the case 131 is mounted on the cowl panel 110*b* by making use of a support bracket 112 of an L-shaped cross section which is secured to the cowl panel 110*b*. Furthermore, a metallic reinforcement material (a reinforcement plate) 111 is secured on the portion of the cowl panel 110*b* where the case 131 is secured thereto for reinforcement on a front side which is situated in an opposite direction to the direction in which the air bag 145 projects. In addition, the cowl 110 also includes a synthetic resin cowl louver 110*a* which is provided upwards of the cowl panel 110*b* in such a manner as to be directed from an upper surface side of the windshield 105 obliquely forwards downwards so as to moderately continue to the bottom wall 131*c* lying on the lower edge side of the opening wall 132 of the case 131. The cowl louver 110*a* is notched in the vicinity of the hinge base 122 in order to avoid the interference with the hinge arm 123.

As is indicated by chain double-dashed lines in FIG. 14 and shown in FIGS. 16 to 19 and 22A, 22B, when completing deployment and inflation by inflation gas introduced thereinto, the air bag 144 is configured to include an upper inflation portion 159 which is adapted to cover an upper surface 114 of the lateral side edge 120 of the hood panel 113 at the rear end 116 thereof and the lower inflation portion 145 which extends rearwards from the case 131 as an accommodating location through the projection space PS formed between the cowl 110 below the rear end 116 of the hood panel 113 and the rear end 116 of the hood panel 113, so as to cover a front side of a front pillar 106.

Figure 17:
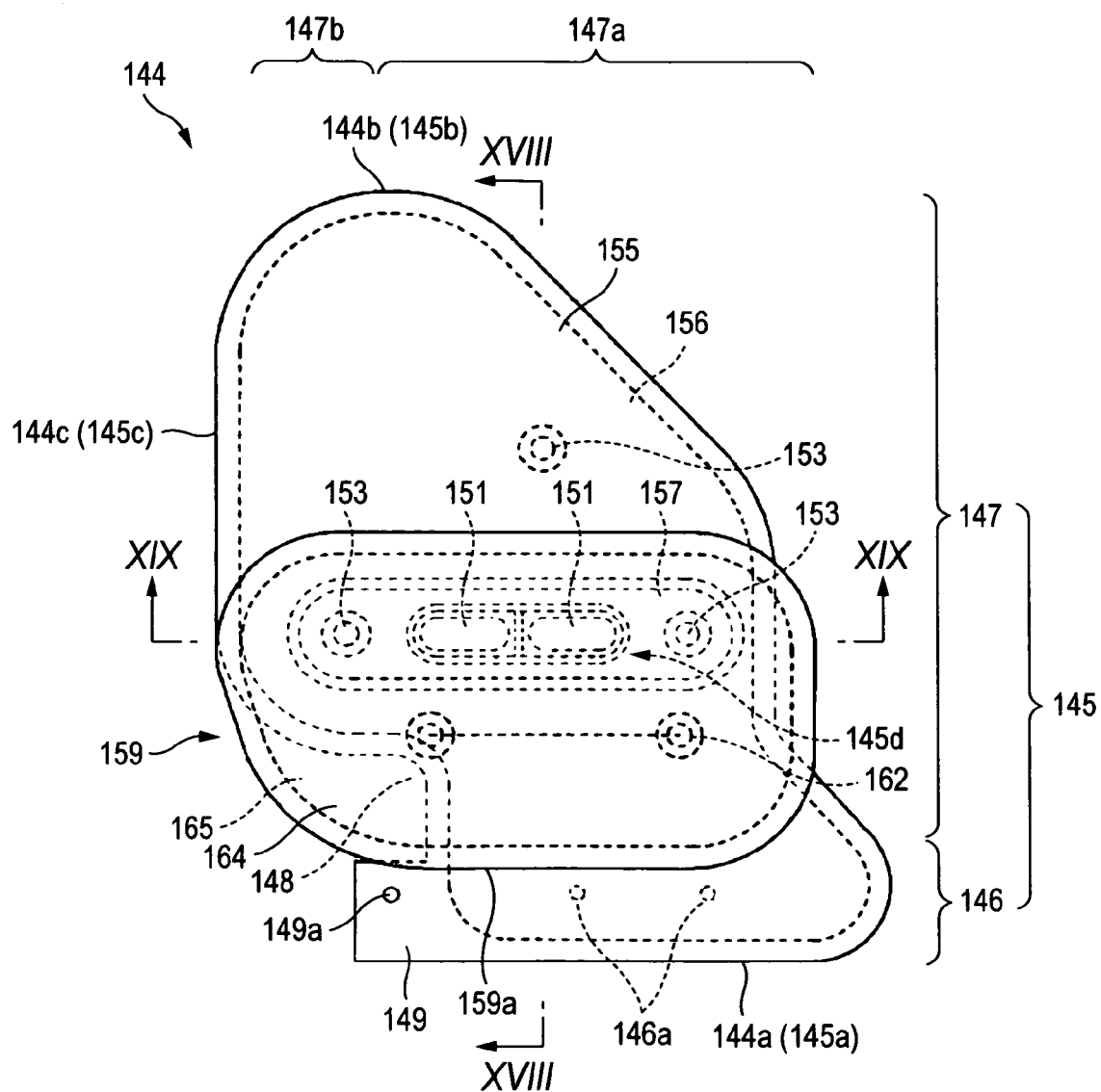
FIG. 17 is a plan view of the air bag which is used in the pedestrian protection air bag system of the third embodiment.
Figure 18:
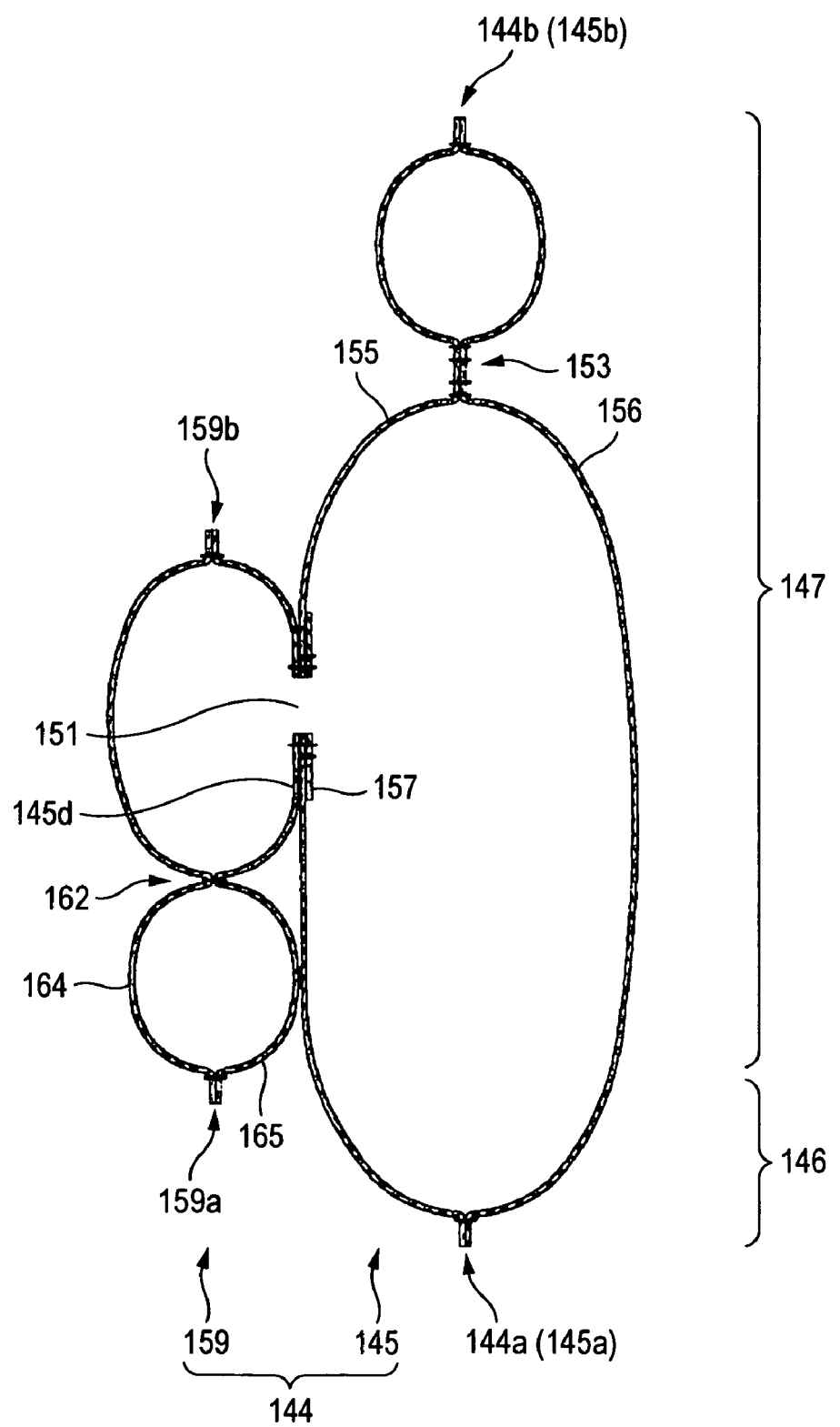
FIG. 18 is an end view showing an inflated state of the air bag alone which is used in the third embodiment, which corresponds to a section taken along the line XVIII-XVIII in FIG. 17.
Figure 19:
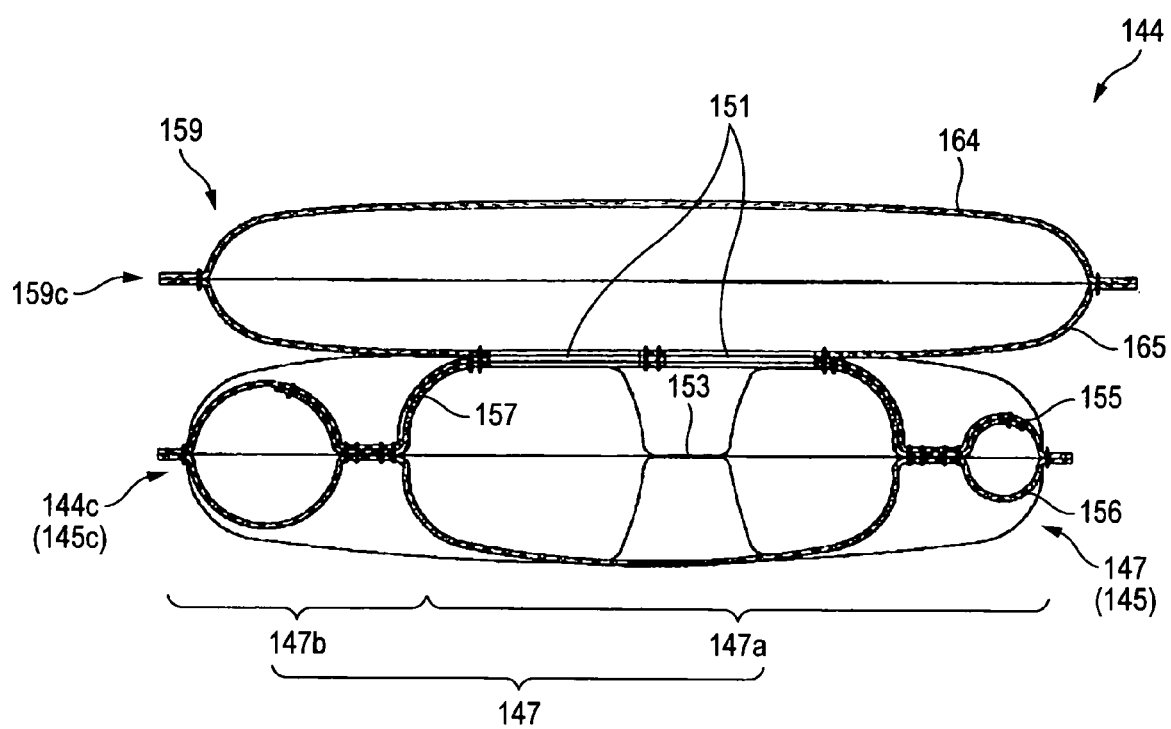
FIG. 19 is an end view showing the inflated state of the air bag alone which is used in the third embodiment, which corresponds to a section taken along the line XIX-XIX in FIG. 17.
Figure 21A:
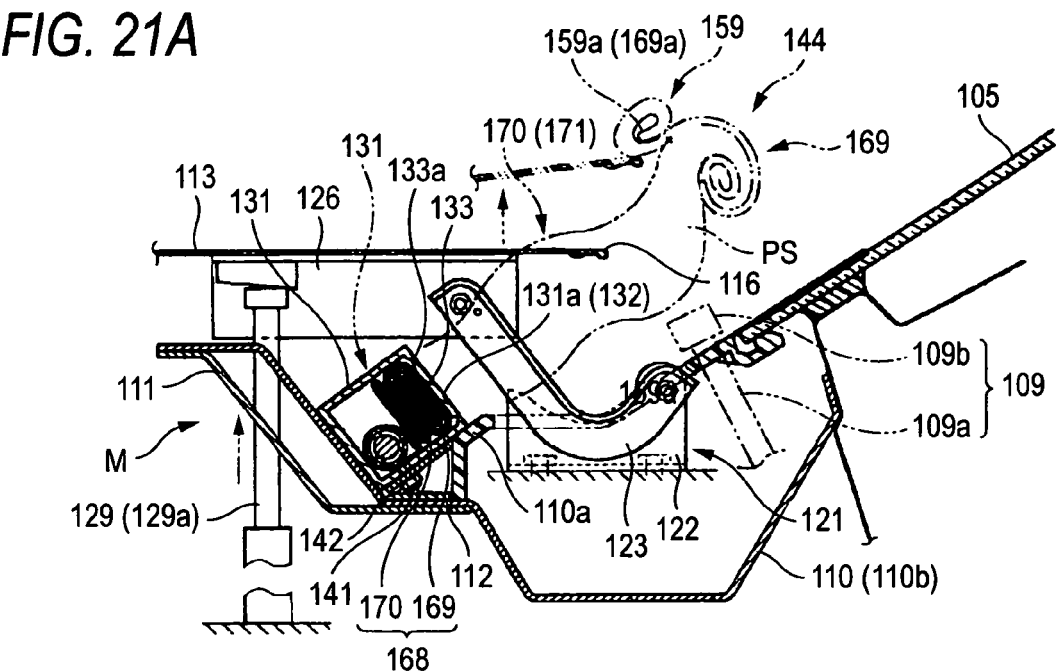
FIGS. 21A and 21B are schematic vertical sectional views taken along a longitudinal direction of the vehicle which show operations of the third embodiment in the order of occurrence.

The lower inflation portion 145 of the air bag 144 is formed into a substantially rectangular plate-like bag shape which includes a proximal portion 146 which is disposed on a case 131 side thereof which constitutes a front end 145*a* (refer to FIGS. 21A to 22B) side and a main body portion 147 which extends rearwards from the proximal portion 146 so as to cover the front side of the front pillar 106 over an area from a lower end of the front pillar 106 part-way up to a vertical intermediate portion thereof. In addition, an upper surface side of the lower inflation portion 147 is made to function as a pedestrian side wall portion 155 which can receive a pedestrian and a lower side is made to function as a body side wall portion 156 which is brought into contact with a windshield 105 and the front pillar 106 (refer to FIGS. 16 to 19). Furthermore, the lower inflation portion 145 is configured to include, as a shape resulting when it completes inflation, a recessed portion 148 which is made to follow inner edges (edges facing the engine compartment ER) of the hinge base 122 and the hinge arm 123 which is raising the push-up rotation pivot portion 125 on a proximal portion 146 side of the main body portion 147. Due to this, the main body portion 147 of the lower inflation portion 145 is made up a rear extending portion 147a which extends rearwards from the proximal portion 146 and a side edge portion 147b which lies rearwards of the recessed portion 148. In addition, as is shown in FIGS. 16, 17, 21, mounting holes 146a are formed in the body side wall portion 156 of the proximal portion 146 in two locations along a lateral direction thereof through which the bolts 141 of the inflator 138 are made to project. Furthermore, the side edge mounting portion 149 provided with the mounting hole 149a is formed on a circumferential edge of the proximal portion 146 which faces the lateral side edge 145c of the lower inflation portion 145. This side edge mounting portion 149 is disposed in such a manner as to project further towards the side edge 145 side than an inflating area of the proximal portion 146 so as to enter the recessed portion 148 to thereby prevent the floating of the lateral side edge 145c side of the lower inflation portion 145 from the front pillar 106 as much as possible, and is then mounted and fixed to the mounting wall portion 135 of the case 131.

In addition, inflation gas inlet ports 151 to the upper inflation portion 159 are provided in the pedestrian side wall portion 155 of the rear extending portion 147a of the lower inflation portion 145 in a location which lies near the rear end 116 of the hood panel 113 when the air bag 144 completes inflation (refer to FIGS. 21A to 22B). In the case of this embodiment, the inlet ports 151 are provided two in such a manner as to lie in parallel in a lateral direction thereof (refer to FIGS. 16, 17).

Additionally, thickness restricting portions 153 are formed on the lower inflation portion 145 by connecting the pedestrian side wall portion 155 and the body side wall portion 156 together locally by means of sewing so that the lower inflation portion 145 is caused to inflate into a plate-like shape.

Note that a reinforcement fabric 157 is provided along circumferential edges of the inlet ports 151, and the reinforcement fabric 157 is provided to extend as far as the regions of the thickness restricting portions 153 which lie on left and right sides of the inlet ports 151, 151.

In addition, in the lower inflation portion 145, a portion 145d lying on front edges of the inlet ports 151, 151 which comes to lie below the rear end 116 of the hood panel 113 when the air bag completes inflation is configured such that a vertical thickness VT in such a state that the hood panel 113 does not exist is made larger than an isolating dimension SL resulting between the rear end 116 of the hood panel 113 which is being raised to form the projection space PS for the air bags 144 and the cowl 110 (refer to FIG. 23).

The upper inflation portion 159 of the air bag 144 is formed, as a shape resulting when the air bag completes inflation, into a laterally extending rectangular plate shape, is provided in such a manner as to extend forwards from the circumferential edges of the inlet ports 151, 151 and is configured such that a front end (a front edge) 159a thereof extends to be disposed as far as a position lying further rearwards than the case 131 functioning the accommodating location (refer to FIGS. 22, 24). In addition, the upper inflation portion 159 is configured such that a lateral side edge 159c side thereof extends over the recessed portion 148 of the lower inflation portion 145 to cover it and reaches as far as near the lateral side edge 145c of the side edge portion 147b, that is, in the case of this embodiment, overlaps the side edge 145c (refer to FIGS. 19, 25).

This upper inflation portion 150 is also configured such that an upper surface side is made to function as a pedestrian side wall portion 164 which can receive a pedestrian and a lower surface side as a body side wall portion 165 which is connected to the circumferential edges of the inlet ports 151, 151 by means of sewing, and a thickness restricting portion 162 is formed in the vicinity of the longitudinal center thereof by connecting the pedestrian side wall portion 164 and the body side wall portion 165 together by means of sewing so that the upper inflation portion 159 can inflate into the plate-like shape.

The pedestrian side wall portions 155, 164 and the body side wall portions 156, 165 of the lower inflation portion 145 and the upper inflation portion 159 are formed of flexible woven fabrics such as polyester or polyamide, the pedestrian side wall portion 155 of the lower inflation portion 145 on which the reinforcement fabric 157 is disposed and the body side wall portion 165 of the upper inflation portion 159 are superposed on each other and are then connected together around the circumferential edges of the inlet ports 151, 151 by mans of sewing, while the body side wall portion 156 is superposed on the pedestrian side wall portion 155 of the lower inflation portion and the body side wall portion 156 and the pedestrian side wall portion 155 are connected to each other around outer circumferential edges thereof by sewing, and at the same time, the thickness restricting portions 153 are formed, whereby the lower inflation portion 145 is formed into a bag-like shape. Similarly, the pedestrian side wall portion 164 is superposed on the body side wall portion 165 of the upper inflation portion 159, and the pedestrian side wall portion 164 and the body side wall portion 165 are connected together around outer circumferential edges thereof by sewing, and as the same time, the thickness restricting portion 162 is formed, where by the upper inflation portion 159 is formed into a bag-like shape. Thus, the air bag 144 can be fabricated in the way described above. In addition, in the case of this embodiment, the inflator 138 is accommodated in the interior of the lower inflation portion 145 when it is formed into the bag-like shape.

When folding the air bag 144 for accommodation in the case 131, firstly, as is shown in FIG. 20A, the pedestrian side wall portions 155, 164 and the body side wall portions 156, 165 are deployed flat in such a state that the upper inflation portion 159 is placed over the lower inflation portion 145. Then, as is shown in FIGS. 20A, 20B, the front end 159a side of the upper inflation portion 159 is subjected to external roll folding in which it is wound upwards as far as near the inlet ports 151, 151 so as to form an externally roll folded portion 167. Following this, as is shown in FIGS. 20B, 20C, a longitudinal fold 168 is produced, the side edge portion 147b of the main body portion 147 is placed on the rear extending portion 147a of the lower inflation portion 145 together with the upper inflation portion 159. Then, as is shown in FIGS. 20D, 20E, when the air bag 144 is folded from a rear end 144b side in such a manner that the front end 144b approaches a front end 144a side thereof, this completes the folding of the air bag 144.

In the case of this embodiment, when folding the air bag 144 from the rear end 144b side in such a manner that the rear end 144b side approaches the front end side 144a, as is shown in FIGS. 20C, 20D, the rear end (upper end) 144b side of the air bag is roll folded as winding it on the lower body side wall portion 156 side so as to form an internally roll folded portion 169. Thereafter, as is shown in FIGS. 20D, 20E, a corrugated portion 170 where folds are produced in such a manner as to be superposed on one another by corrugating the relevant portion is provided between the internally roll folded portion 169 and the front end 144a, whereby the folding of the air bag is completed.

Then, this corrugated location 171 is made to have a length equal to a length dimension BL which allows the internally roll folded portion 169 which projects from the case 131 when the air bag 144 deploys and inflates to surpass an area where a pivot shaft portion 109a and an arm 109b of a wiper 109 (refer to FIGS. 14, 21A, 21B) are disposed. In addition, when folding the air bag 144, the folding is carried out in such a state that the inflator 138 is accommodated therein, and when the folding of the air bag 144 is completed, the air bag 144 so folded up is wrapped by a wrapping material which prevents the collapse of folds so produced for accommodation in the case 131.

In the pedestrian protection air bag system M according to the embodiment, when in operation, as is shown in FIGS. 15, 21, the actuator 129 raises the push-up rod 129a which is kept in abutment with the seat 128 o the lower surface 115 side of the hood panel 113 near the lateral side edge 120 near the rear end 116 thereof so as to form a projection space SP for the air bag 144. As this occurs, in the hinge mechanism 121, the shear pin 127 is shorn, and the hinge arm 123 raises the push-up rotation pivot portion 125 side which is the rear end 123c side thereof obliquely forwards upwards from the normal rotation pivot portion 124 side while allowing both the normal rotation pivot portion 124 and the push-up rotation pivot portion 125 to rotate relative to the hinge base 122 and the mounting bracket 126, respectively.

Then, as is shown in FIGS. 21A, 21B, 24A, 24B, the air bag 144 introduces thereinto inflation gas G which is discharged from the gas discharge ports 139a (refer to FIG. 16) of the inflator 138, pushes to open the door portion 133 so as to project rearwards from the opening wall 132 of the case 131, and deploys and inflates through the projection space PS for the air bags 144 formed between the rear end 116 of the hood panel 113 which has been raised and the cowl 110 while smoothing the folds produced.

As this occurs, in an attempt to smooth the folds by substantially reversing the folding process, the air bag 144 firstly deploys in such a way that the rear end 144b moves away from the front end 144a of the air bag 144 to thereby result, as is shown in FIGS. 21A, 21B, 24A, 24B, in such a state that the side edge portion 147b of the main body portion 147 of the lower inflation portion 145 is disposed above the rear extending portion 147a and the inlet ports 151, 151 of the lower inflation portion 145 are disposed near the rear of the rear end 116 of the hood panel 113, whereby the inflation gas G flows into the upper inflation portion 159 from the lower inflation portion 145 via the inlet ports 151, 151. Then, since the front end 159a side is made to made up of the externally roll folded portion 167 where the relevant portion is subjected to external roll folding in which the portion is wound upwards as far as near the inlet ports 151, 151, when the externally roll folded portion 167 smoothes the folds in such a manner as to unwind the roll, the upper inflation portion 159, as is shown in FIGS. 21A, 21B, 22A, 22B, comes into contact with the upper surface 114 of the hood panel 113 from the rear end 116 thereof so as to deploy with ease over the upper surface 114 as rolling thereover, whereby the upper inflation portion 159 smoothly deploys over the upper surface 114 side of the hood panel 113. Furthermore, the front end 159a side of the upper inflation portion 159 is made to extend only short from the inlet ports 151 so that the upper inflation portion 159 does not project further forwards than the position of the case 131 as the accommodating location even when the air bag 144 completes deployment and inflation, and the internally roll folded portion 169 is prevented from becoming voluminous, whereby a winding core 169a (the front end 159a) of internal roll folds is made easy to be disposed from the vicinity of the rear of the rear end 116 of the hood panel 113 to the vicinity of the upper portion, thereby making it possible to secure a smooth deployment of the upper inflation portion 159 to the upper surface 114 side of the hood panel 113.

Figure 24A:
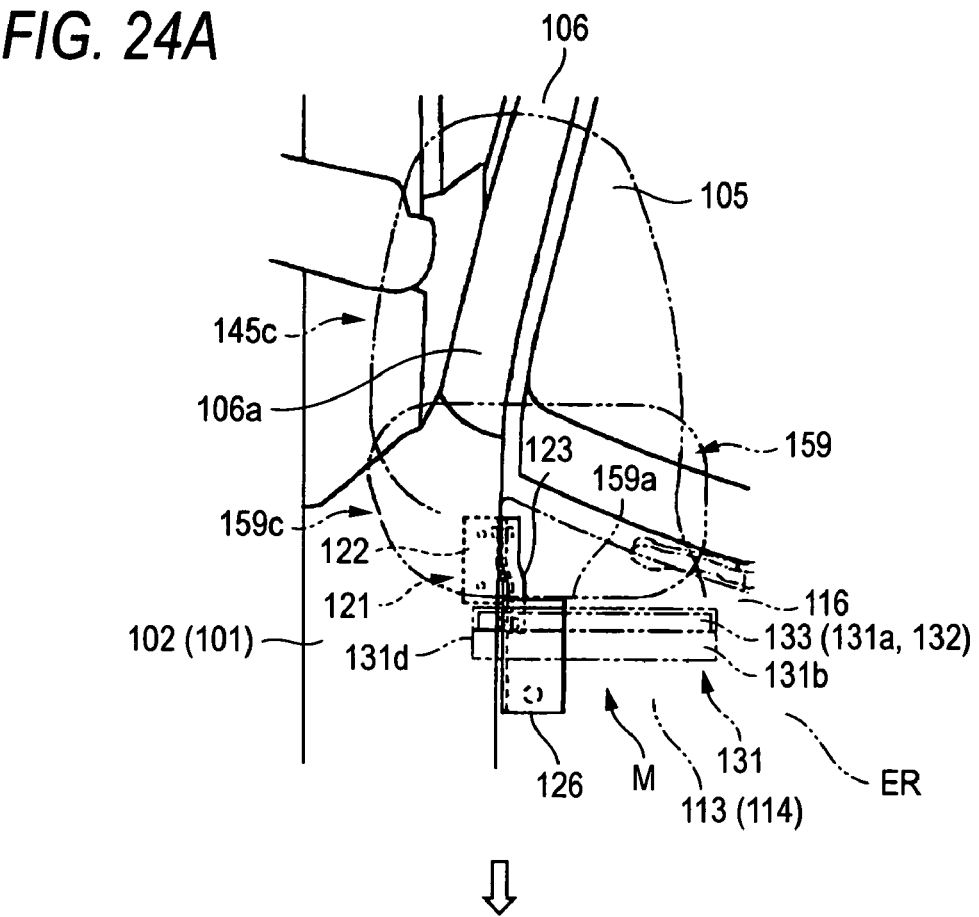
FIGS. 24A and 24B are schematic partial plan views showing operations of the third embodiment in the order of occurrence.
Figure 24B:
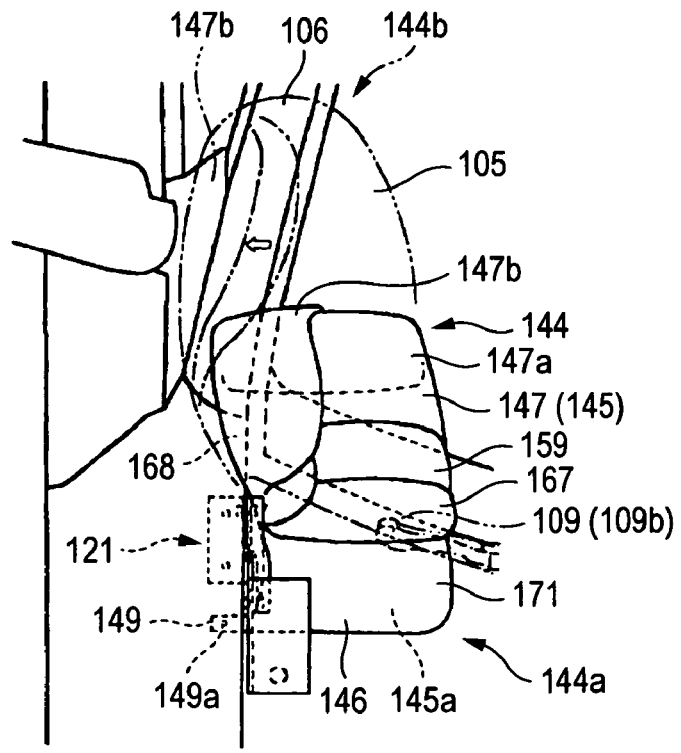
Figure 25A:
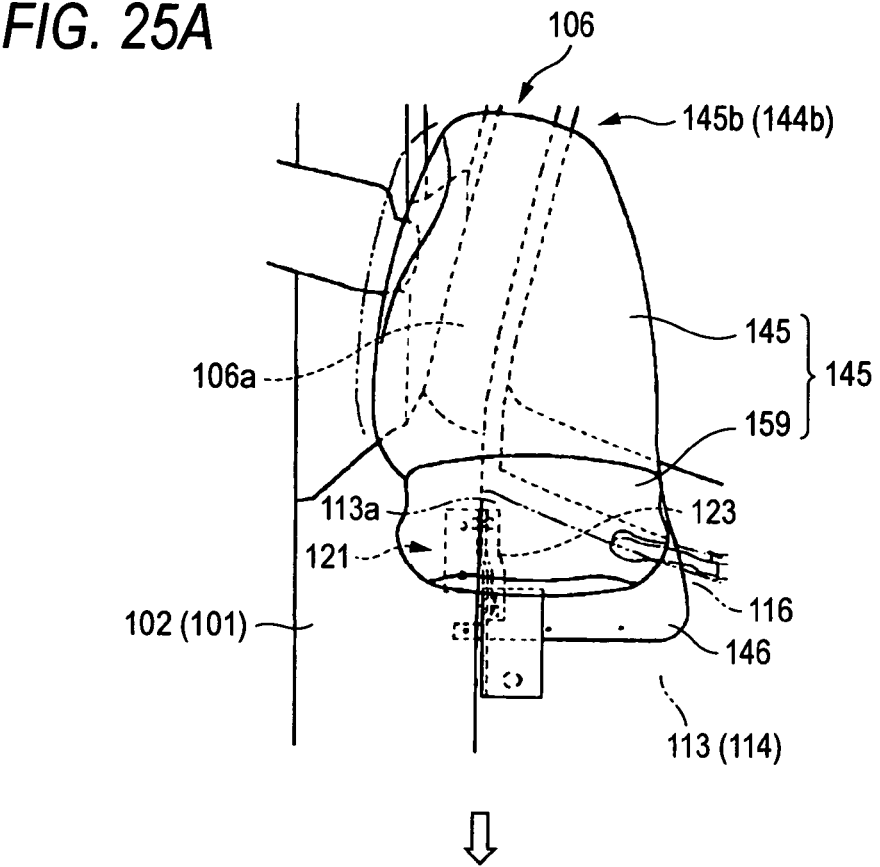
FIGS. 25A and 25B are schematic partial plan views showing, in the order of occurrence, operations of the third embodiment which follow the operations shown in FIG. 24.

Furthermore, as is shown in FIGS. 24A, 24B, 25A, the lower inflation portion 145 smoothes folds in such a manner that the side edge portion 147b rise from the rear extending portion 147a, whereby the side edge portion 147b prevents the interference with the hinge mechanism 121 by bypassing the hinge mechanism 121 by the recessed portion 148 and can thereby be disposed to approach the front pillar 106 from directly below the front pillar 106, and the main portion 147 of the lower inflation portion 145 including the side edge portion 147b which is positioned upwards (rearwards) of the recessed portion 148 and is formed to project transversely outboards from the front side 106a of the front pillar 106 can cover the front side 106a of the front pillar 106 widely and stably with the area expanding from the rear extending portion 147a which lies rearwards of the proximal portion 146 to the side edge portion 147b.

Figure 25B:
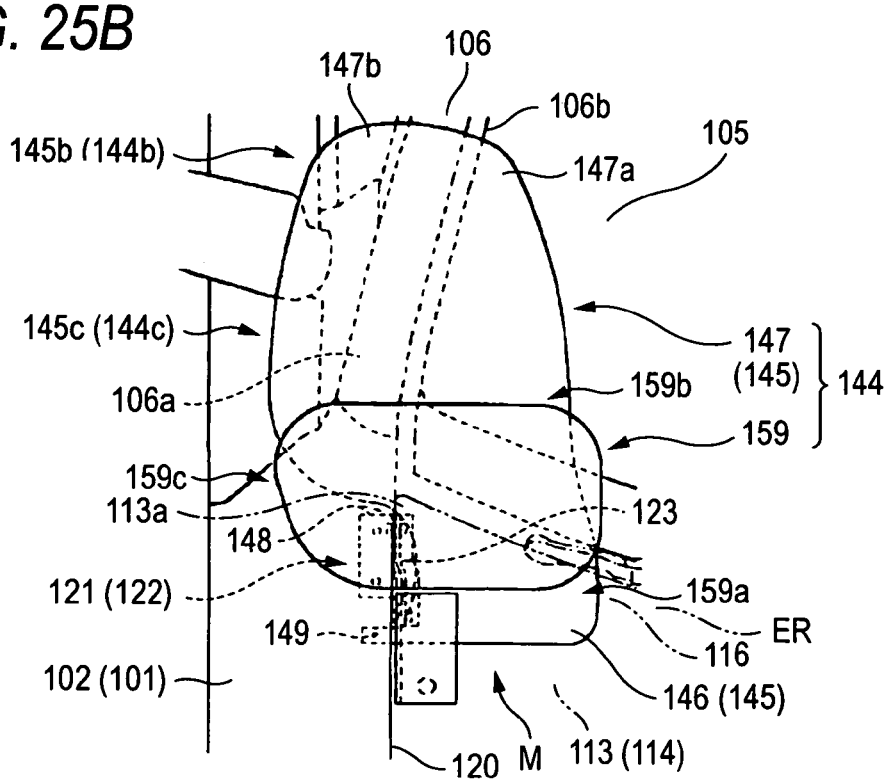

In addition, of course, as is shown in FIG. 25B, the upper inflation portion 159 which is disposed on the upper surface side of the lower inflation portion 145 not only covers the upper surface 114 of the hood panel 113 at the rear end 116 thereof but also passes over the recessed portion 148 of the lower inflation portion 145 and reaches as far as above the front of the side edge portion 147b to cover those areas, whereby the corner portion 113a at the rear end 116 of the hood panel 113 which lies in front of the front pillar 106 can also be covered smoothly. In addition, in the case of the vehicle V of this embodiment, an inner edge 106b of the front pillar 106 which faces the windshield 105 is disposed in such a manner as to be oriented forwards so as to continue to the side edge 120 of the hood panel 113, and the corner portion 113a at the rear end 116 of the hood panel 113 is disposed in front of the front pillar 106.

Consequently, in the pedestrian protection air bag system M according to the embodiment, on the right edge 119 side of the hood panel 113 as with the left edge 118 thereof, the air bag 144 accommodated on the cowl 110 can deploy and inflate stably and smoothly, thereby making it possible to cover the front side 106a of the front pillar 106 and the vicinity of the corner portion 113a at the rear end 116 of the hood panel 113 on the upper surface 114 side thereof.

Figure 22A:
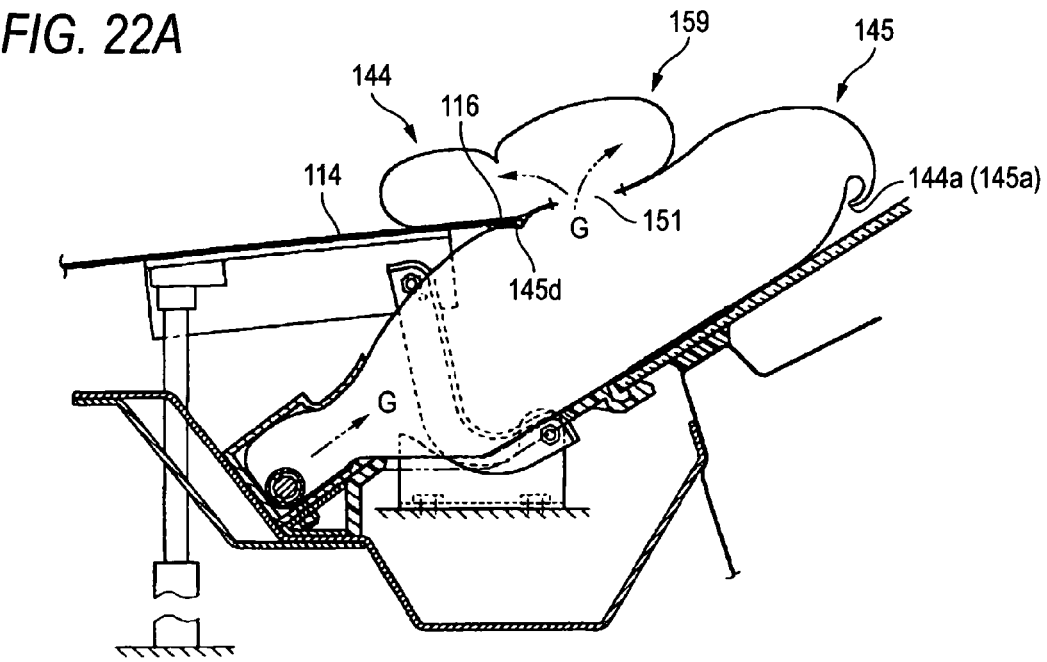
FIGS. 22A and 22B are schematic vertical sectional views taken along a longitudinal direction of the vehicle which show, in the order of occurrence, operations of the third embodiment which follows the operations shown in FIGS. 21A and 21B.
Figure 22B:
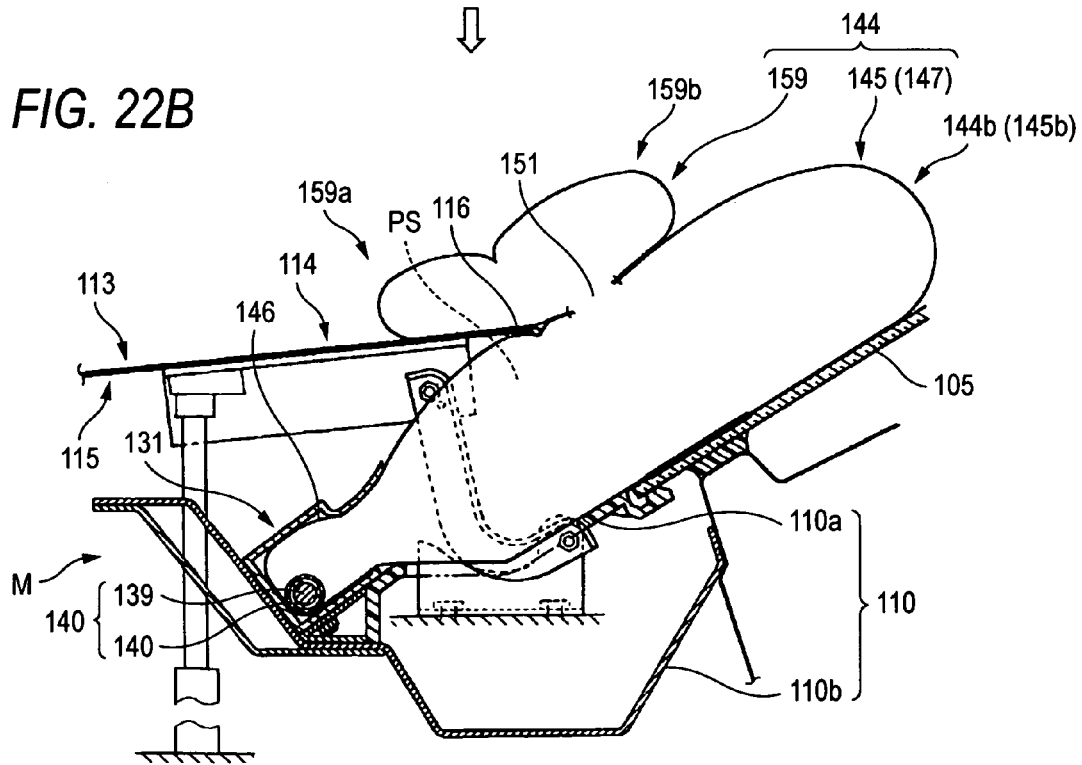

In addition, in the case of the embodiment, in the event that the lower inflation portion 145 of the air bag 144 is configured such that the vertical thickness dimension VT which results below the rear end 116 of the hood panel 113 when the air bag 144 completes inflation in such a state that the hood panel 113 does not exist is made larger than the isolating dimension SL between the rear end 116 of the hood panel 113 which has been raised to form the projection space PS for the air bag 144 and the cowl 110 (refer to FIG. 23). Due to this, as is shown in FIG. 22B, the lower inflation portion 145 comes to be held between the rear end 116 of the hood panel 113 and the cowl 110 when the air bag 144 completes inflation in such a state that the air bag system is fitted on the vehicle, whereby the lower inflation portion 145 can cover the front side 106a of the front pillar 106 stably without deviating transversely, and the upper inflation portion 159 which is projecting upwards from the lower inflation portion 145 can also be prevented from deviating transversely, thereby making it possible to protect a pedestrian from the front pillar 106 and the corner portion 113a at rear end 116 of the hood panel 113 in an accurate fashion.

Additionally, in this embodiment, when folding the air bag 144, the air bag 144 is folded from the rear end 144b side thereof in such a manner that the rear end side 144*b* approaches the front end side 144*a* thereof after the side edge portion 147*b* of the main body portion 147 of the lower inflation portion 145 is placed on the rear extending portion 147*a* together with the upper inflation portion 159, the area (portion) 171 corresponding to the length BL which surpasses the range which expands from the case 131 as the accommodating location to the region where the wiper 109 is provided when the air bag 144 completes inflation is corrugated into folds to form the corrugated portion 170 where the folds are superposed on one another in the longitudinal direction and the area residing rearwards of the corrugated portion 170 is folded to form the internally roll folded portion 169 where the rear end 144*b* of the air bag 144 is wound downwards, whereby the air bag 144 is folded for accommodation in the case 131.

Figure 21B:
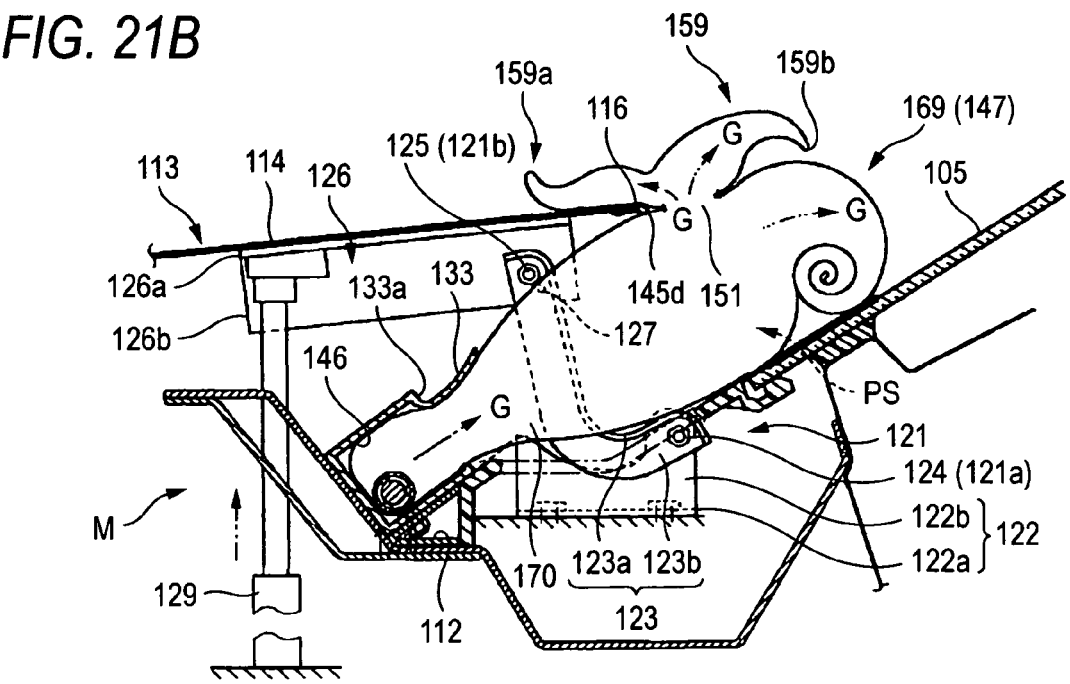

Due to this, when the air bag 144 projects rearwards from the case 131 as the accommodating location in the initial stage of deployment and inflation thereof, the corrugated portion 170 which is folded by employing the corrugating technique which enables folds produced thereby to be smoothed more quickly than folds produced by the roll folding technique can, as is indicated by the chain double-dashed lines shown in FIG. 14, push out the internally roll folded portion 169 into which most of the region of the air bag 144 is folded further rearwards than the area where the wiper 109 is provided. In addition, as is shown in FIGS. 21B, 22A, 22B, when the folds in the internally roll folded portion 169 are smoothed, the internally roll folded portion 169 attempts to deploy along the windshield 105. When the folds are smoothed in that way, in the event that the externally roll folded portion 167 on the front end 159*a* side of the upper inflation portion 159 appears in the vicinity of the rear of the rear end 116 of the hood panel 113, the front end 159*a* side of the upper inflation portion 159 smoothly deploy over the upper surface 114 side of the hood panel 113 in such a manner as to depart from the internally roll folded portion 169, while the internally roll folded portion 169 of the lower inflation portion 145 continues to deploy along the windshield 105 until the air bag 144 completes deployment to the portion lying in the vicinity of the rear end thereof, and following this, as is shown in FIGS. 21B, 22A, 22B, the folds in the side edge portion 147*b* are smoothed, whereby the lower inflation portion 145 can complete deployment and inflation while being prevented from floating from the windshield 105 and the front pillar 106 as much as possible. Namely, the air bag 144 can dispose the main portion body 147 of the lower inflation portion 145 on the front side 6*a* of the front pillar 106 smoothly and quickly by suppressing not only the interference of the lower inflation portion 145 and the upper inflation portion 159 with the wiper 109 but also the floating of the lower inflation portion 145 from the windshield 105 and the front pillar 106.

Of course, unless the point described above is taken into consideration, the side edge portion 147 of the main body portion 147 is placed on the rear extending portion 147*a* of the lower inflation portion 145 together with the upper inflation portion 159 of the air bag 144, and thereafter, the air bag 144 is folded from the rear end 144*b* side in such a manner that the rear end 144*b* side approaches the front end 144*a* side thereof, whereby the whole of the air bag may be corrugated, externally roll folded or internally roll folded.

What is claimed is:

1. A pedestrian protection air bag system comprising cases and air bags folded and accommodated, respectively, in the cases, which cases and air bags are provided and mounted on a cowl of a vehicle in locations lying below left and right edges of a hood panel near a rear end thereof, respectively, each air bag being configured to cover a front side of a front pillar of the vehicle which lies in the vicinity of the case when the air bag projects rearwards from the case by introducing inflation gas thereinto, the hood panel being provided in such a manner that a rear end side is raised so as to form a projection space between the cowl and the rear end of the hood panel for the air bag to project therethrough when the air bag deploys and inflates while when in normal use, a front end side can be raised to open upwards by hinge mechanisms provided near the left and right edges at the rear thereof, respectively, wherein the hinge mechanisms which are provided on left and right sides of the hood panel near the rear end thereof each comprise:

a hinge base which is fixed to a body of the vehicle to lie at the rear and transversely slightly outboards of the left or right side edge of the hood panel as viewed from the top;

a mounting bracket which is fixed to the hood panel to be disposed at the front of the hinge base within the region of the hood panel as viewed from the top; and a hinge arm which is pivotally supported on the hinge base on a rear end side and is pivotally supported on the mounting bracket on a front end side thereof and in which a rear end side pivot portion which is pivotally supported on the hinge base is made to be a normal rotation pivot portion which is made to rotate both when the hood panel is in normal use and when the hood panel is raised to form the projection space and a front end side pivot portion which is pivotally supported on the mounting bracket is made to be a push-up rotation pivot portion which is made to rotate only when the hood panel is raised to form the projection space, wherein actuators which are adapted, when in operation, to raise push-up rods which are brought into abutment with a lower surface of the hood panel with their axes made to follow a vertical direction so as to form the projection space are provided, respectively, at the front of the push-up rotation pivot portions of the left and right hinge arms below a lower side of the hood panel near the left and right edges thereof, wherein the cases in which the air bags are accommodated and held are provided, respectively, at the front of the hinge bases and at the rear of the push-up rods of the actuators within the region of the hood panel as viewed from the top with their lateral outer edges disposed near the left and right edges, respectively, near the rear end of the hood panel, and wherein the air bags each comprise as a shape formed when the air bag completes inflation a proximal portion which is disposed on the air bag which faces the case and a main body portion which extends rearwards from the proximal portion so as to cover the front side of the front pillar and comprise on the main body portion which faces the proximal portion a recessed portion which is made to follow inner edges of the hinge base and the hinge arm which has raised its side where the push-up rotation pivot portion resides.

2. A pedestrian protection air bag system as set forth in claim 1, wherein an inflator for supplying inflation gas to the air bag comprises a supply pipe line for supplying inflation gas to the air bag accommodated within the case and is fixed to the body of the vehicle outside the case.

3. A pedestrian protection air bag system comprising air bags folded and accommodated on a cowl of a vehicle in locations lying below left and right edges of a hood panel near a rear end thereof, respectively, the air bags each comprising, when the air bag introduces inflation gas thereinto, an upper inflation portion which covers an upper surface of a left or right side edge of the hood panel at a rear end thereof and a lower inflation portion which extends rearwards from the accommodating location through between the cowl below the rear end of the hood panel and the rear end of the hood panel so to cover a front side of a front pillar, the hood panel being provided in such a manner that a rear end side is raised so as to form a projection space between the cowl and the rear end of the hood panel for the air bag to project therethrough when the air bag deploys and inflates while when in normal use, a front end side can be raised to open upwards by hinge mechanisms provided near the left and right edges at the rear thereof, respectively, wherein the lower inflation portion of the air bag comprises, as a shape resulting when the air bag completes inflation, a proximal portion which is situated on a front end side and is mounted on the accommodating location and a main body portion which extends rearwards from the proximal portion so as to cover the front side of the front pillar, wherein the main body portion comprises a recessed portion which is provided on a proximal portion thereof in such a manner as to follow an inner edge of the hinge mechanism, a side edge portion which is disposed rearwards of the recessed portion and a rear extending portion which extends rearwards of the proximal portion, the main body portion further comprising a gas inlet port to the upper inflation portion which is disposed near the rear of the rear end of the hood panel when the air bag completes inflation, wherein the upper inflation portion of the air bag is configured such that when the air bag completes inflation, a front end reaches as far as a position lying further rearwards than the accommodating location while covering an area over the recessed portion to reach as far as near a lateral side edge of the side edge portion, and wherein the air bag deploys flat with the upper inflation portion placed above the lower inflation portion, thereafter, a front end side of the upper inflation portion is subjected to external roll folding in which it is wound upwards to the vicinity of the inlet port, following this, the side edge portion of the main body portion of the lower inflation portion is placed on the rear extending portion together with the upper inflation portion, and the air bag is folded from a rear end side thereof in such a manner that the rear end side approaches a front end side for accommodation in the accommodating location.

4. A pedestrian protection air bag system as set forth in claim 3, wherein the lower inflation portion of the air bag is configured such that a vertical thickness dimension resulting below the rear end of the hood panel when the air bag completes inflation in such a state that the hood panel does not exist is made larger than an isolating distance between the rear end of the hood panel which is being raised to form the projection space for the air bag and the cowl.

5. A pedestrian protection air bag system as set forth in claim 3, wherein when folding the air bag in such a manner that the rear end side approaches the front end side of the air bag after the side edge portion of the main body portion of the lower inflation portion is placed on the rear extending portion together with the upper inflation portion, an area corresponding to a length which surpasses a range which expands from the accommodating location to a region where a wiper is provided when the air bag completes inflation is corrugated into folds to form a corrugated portion where folds are superposed in a longitudinal direction, and an area residing rearwards of the corrugated portion is folded to form an internally roll folded portion where the rear end of the air bag is wound downwards, whereby the air bag is folded for accommodation in the accommodating location.

* * * * *